US012154300B2

(12) United States Patent
Zhang et al.

(10) Patent No.: US 12,154,300 B2
(45) Date of Patent: Nov. 26, 2024

(54) PREDICTIVE CODING OF BOUNDARY GEOMETRY INFORMATION FOR MESH COMPRESSION

(71) Applicant: Tencent America LLC, Palo Alto, CA (US)

(72) Inventors: Xiang Zhang, Sunnyvale, CA (US); Xiaozhong Xu, State College, PA (US); Jun Tian, Palo Alto, CA (US); Chao Huang, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 85 days.

(21) Appl. No.: 17/973,792

(22) Filed: Oct. 26, 2022

(65) Prior Publication Data

US 2023/0298216 A1 Sep. 21, 2023

Related U.S. Application Data

(60) Provisional application No. 63/319,976, filed on Mar. 15, 2022.

(51) Int. Cl.
*G06T 9/00* (2006.01)
*G06T 7/60* (2017.01)
(Continued)

(52) U.S. Cl.
CPC .............. *G06T 9/001* (2013.01); *G06T 7/60* (2013.01); *G06T 17/20* (2013.01); *G06V 10/28* (2022.01);
(Continued)

(58) Field of Classification Search
None
See application file for complete search history.

(56) References Cited

U.S. PATENT DOCUMENTS 11,016,470 B2 * 5/2021 Marinov ................ B33Y 50/02
11,798,196 B2 * 10/2023 Kim .......................... G06T 17/20
(Continued)

FOREIGN PATENT DOCUMENTS

| WO | WO2020/138352 A1 | 7/2020 |
| WO | WO2020/193038 A1 | 10/2020 |
| WO | WO 2021/146041 A1 | 7/2021 |

OTHER PUBLICATIONS

International Search Report and Written Opinion regarding PCT/US2022/048355 dated Feb. 9, 2023, 7 pages.
(Continued)

*Primary Examiner* — Tize Ma
(74) *Attorney, Agent, or Firm* — Crowell & Moring LLP

(57) ABSTRACT

This disclosure relates to methods and systems for encoding or decoding a 3D mesh with predictive coding of boundary geometry information. The example decoding method includes receiving a coded bitstream comprising a geometry patch for a three-dimension mesh; extracting, from the coded bitstream, a reconstructed geometry image for the geometry patch comprising a set of points corresponding to a set of geometry coordinates for a boundary vertex in the three-dimension mesh; deriving based on the set of the geometry coordinates, a 3D geometry coordinate for the boundary vertex; obtaining a prediction residue for the boundary vertex; and reconstructing, by the device, geometry information of the boundary vertex based on the derived 3D geometry coordinate and the prediction residue.

18 Claims, 12 Drawing Sheets

(51) Int. Cl.
*G06T 17/20* (2006.01)
*G06V 10/28* (2022.01)
*H04N 19/105* (2014.01)

(52) U.S. Cl.
CPC .. *H04N 19/105* (2014.11); *G06T 2207/20164* (2013.01)

(56) References Cited

U.S. PATENT DOCUMENTS

| | | | |
|---|---|---|---|
| 2018/0053324 A1 | 2/2018 | Cohen et al. | |
| 2020/0150624 A1* | 5/2020 | Marinov | G06F 30/00 |
| 2020/0279403 A1 | 9/2020 | Vosoughi et al. | |
| 2021/0217203 A1* | 7/2021 | Kim | G06T 9/001 |
| 2023/0290010 A1* | 9/2023 | Mammou | G06T 9/001 |

OTHER PUBLICATIONS

Japanese Office Action with machine translation regarding 2023-566651 dated Sep. 17, 2024, 7 pages.
Korean Office Action with translation regarding 10-2023-7031887 dated Sep. 19, 2024, 10 pages.

\* cited by examiner

PREDICTIVE CODING OF BOUNDARY GEOMETRY INFORMATION FOR MESH COMPRESSION

INCORPORATION BY REFERENCE

This application is based on and claims the benefit of priority to U.S. Provisional Patent Application No. 63/319,976, filed on Mar. 15, 2022, which is herein incorporated by reference in its entirety.

TECHNICAL FIELD

This disclosure relates generally to mesh encoding (or compression) and mesh decoding (or decompression) processes, and particularly to methods and systems for predictive coding of boundary geometry information for mesh compression.

BACKGROUND

This background description provided herein is for the purpose of generally presenting the context of this disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Various technologies are developed to capture, represent, and simulate real world objects, environments and the like in three-dimension (3D) space. 3D representations of the world can enable more immersive forms of interactive communications. Example 3D representations of objects and environments includes but is not limited to point clouds and meshes. A series of 3D representation of objects and environments may form a video sequence. Redundancies and correlations within the sequence of 3D representations of objects and environments may be utilized for compressing and coding such a video sequence into a more compact digital form.

SUMMARY

This disclosure relates generally to coding (compressing) and decoding (decompressing) of 3D mesh and specifically to predictive coding of boundary geometry information for mesh compression.

The present disclosure describes an embodiment of methods for decoding a geometry patch for a three-dimension mesh. The method includes receiving, by a device, a coded bitstream comprising a geometry patch for a three-dimension mesh. The device includes a memory storing instructions and a processor in communication with the memory. The method also includes extracting, by the device from the coded bitstream, a reconstructed geometry image for the geometry patch comprising a set of points corresponding to a set of geometry coordinates for a boundary vertex in the three-dimension mesh; deriving, by the device, based on the set of the geometry coordinates, a 3D geometry coordinate for the boundary vertex; obtaining, by the device, a prediction residue for the boundary vertex; and reconstructing, by the device, geometry information of the boundary vertex based on the derived 3D geometry coordinate and the prediction residue.

The present disclosure describes another embodiment of methods for decoding a geometry patch for a three-dimension mesh. The method includes receiving, by a device, a coded bitstream. The device includes a memory storing instructions and a processor in communication with the memory. The method also includes extracting, by the device from the coded bitstream, a plurality of geometry predictions for a boundary vertex, wherein each geometry prediction comprises a set of predicted geometry coordinates; determining, by the device based on the plurality of the geometry predictions, a predicted geometry value for the boundary vertex; obtaining, by the device, a prediction residue for the boundary vertex; and reconstructing, by the device, geometry information of the boundary vertex based on the predicted geometry value and the prediction residue.

According to another aspect, an embodiment of the present disclosure provides an apparatus for encoding or decoding 3D mesh. The apparatus includes a memory storing instructions; and a processor in communication with the memory. When the processor executes the instructions, the processor is configured to cause the apparatus to perform the above methods.

In another aspect, an embodiment of the present disclosure provides non-transitory computer-readable mediums storing instructions which when executed by a computer for video decoding and/or encoding cause the computer to perform the above methods.

The above and other aspects and their implementations are described in greater detail in the drawings, the descriptions, and the claims.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
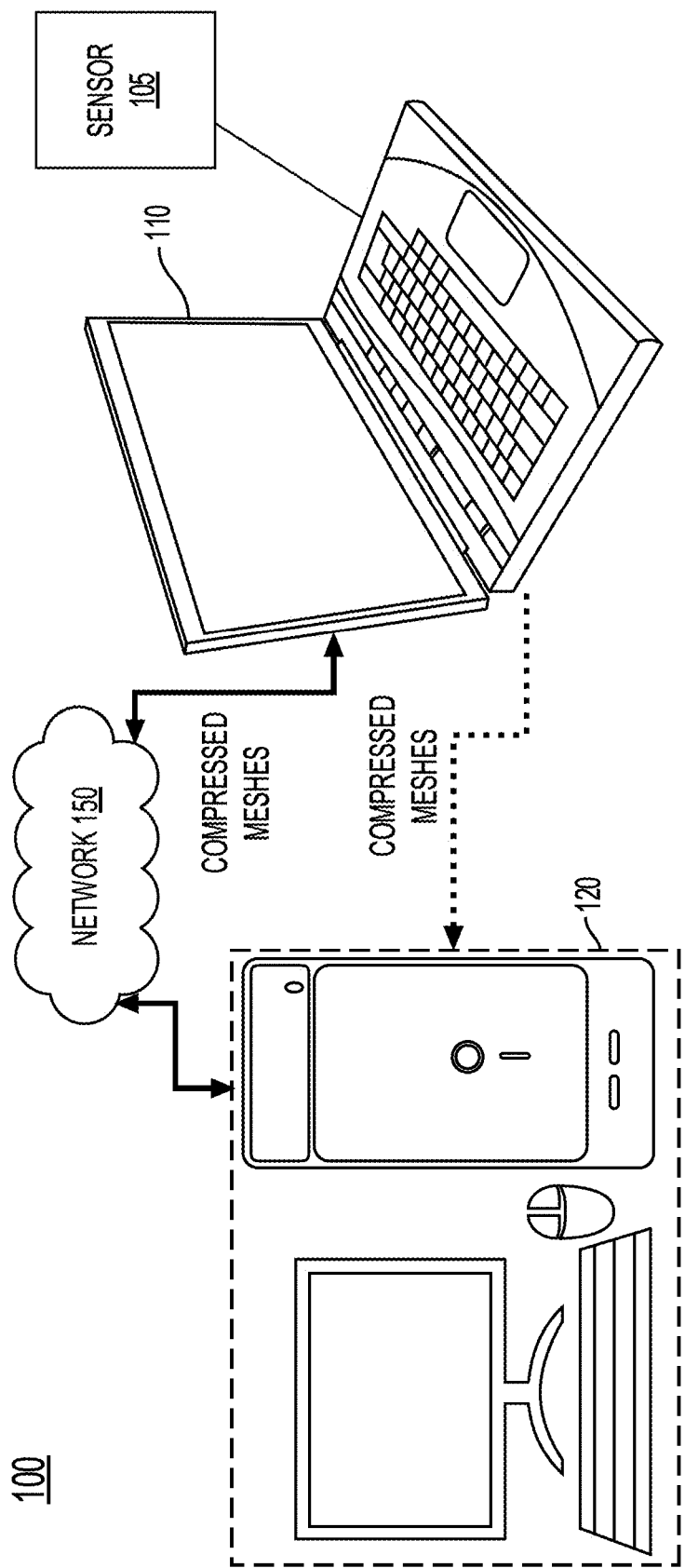
FIG. 1 is a schematic illustration of a simplified block diagram of a communication system in accordance with an embodiment.

Throughout this specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Technological developments in 3D media processing, such as advances in 3D capture, 3D modeling, and 3D rendering, and the like have promoted the ubiquitous creation of 3D contents across several platforms and devices. Such 3D contents contain information that may be processed to generate various forms of media to provide, for example, immersive viewing/rendering and interactive experience. Applications of 3D contents are abundant, including but not limited to virtual reality, augmented reality, metaverse interactions, gaming, immersive video conferencing, robotics, computer-aided design (CAD), and the like. According to an aspect of the disclosure, in order to improve immersive experience, 3D models are becoming ever more sophisticated, and the creation and consumption of 3D models demand a significant amount of data resources, such as data storage, data transmission resources, and data processing resources.

In comparison to traditional 2-dimensional (2D) contents that are generally represented by datasets in the form of 2D pixel arrays (such as images), 3D contents with three-dimensional full-resolution pixilation may be prohibitively resource intensive and are nevertheless unnecessary in many if not most practical applications. In most 3D immersive applications, according to some aspects of the disclosure, less data intensive representations of 3D contents may be employed. For example, in most applications, only topo- graphical information rather than volumetric information of objects in a 3D scene (either a real-world scene captured by sensors such as LIDAR devices or an animated 3D scene generated by software tools) may be necessary. As such, datasets in more efficient forms may be used to represent 3D objects and 3D scenes. For example, 3D meshes may be used as a type of 3D models to represent immersive 3D contents, such as 3D objects in 3D scenes.

A mesh (alternatively referred to as mesh model) of one or more objects may include a collection of vertices. The vertices may connect to one another to form edges. The edges may further connect to form faces. The faces may further form polygons. 3D surfaces of various objects may be decomposed into, for example, faces and polygons. Each of the vertices, edges, faces, polygons, or surfaces may be associated with various attributes such as color, normal, texture, and the like. The normal for a surface may be referred as the surface normal; and/or the normal for a vertex may be referred as the vertex normal. The information of how the vertices are connected into edges, faces or polygons may be referred to as connectivity information. The connectivity information is important for uniquely defining components of a mesh since the same set of vertices can form different faces, surfaces, and polygons. In general, a position of a vertex in 3D space may be represented by its 3D coordinates. A face may be represented by a set of sequentially connected vertices, each associated with a set of 3D coordinates. Likewise, an edge may be represented by two vertices each associated with its 3D coordinates. The vertices, edges, and faces may be indexed in the 3D mesh datasets.

A mesh may be defined and described by a collection of one or more of these fundamental element types. However, not all types of elements above are necessary in order to fully describe a mesh. For example, a mesh may be fully described by using just vertices and their connectivity. For another example, a mesh may be fully described by just using a list of faces and common vertices of faces. As such, a mesh can be of various alternative types described by alternative dataset compositions and formats. Example mesh types include but are not limited to face-vertex meshes, winged-edge meshes, half-edge meshes, quad-edge meshes, corner-table meshes, vertex-vertex meshes, and the like. Correspondingly, a mesh dataset may be stored with information in compliance with alternative file formats with file extensions including but not limited to .raw, .blend, .dbx, .3ds, .dae, .dng, 3dm, .dsf, .dwg, .obj, .ply, .pmd, .stl, amf, .wrl, .wrz, .x3d, .x3db, .x3dv, .x3dz, .x3dbz, .x3dvz, .c4d, .lwo, .smb, .msh, .mesh, .veg, .z3d, .vtk, .14d, and the like. Attributes for these elements, such as color, normal, texture, and the like may be included into a mesh dataset in various manners.

In some implementations, vertices of a mesh may be mapped into a pixelated 2D space, referred to as a UV space. As such, each vertex of the mesh may be mapped to a pixel in the UV space. In some implementations, one vertex may be mapped to more than one pixels in the UV space, for example, a vertex at a boundary may be mapped to two or three pixels in the UV space. Likewise, a face or surface in the mesh may be sampled into a plurality of 3D points that may or may not be among recorded vertices in the mesh, and these plurality of 3D points may be also mapped to pixels in the 2-dimensional UV space. Mapping the vertices and sampled 3D points of faces or surfaces in a mesh into the UV space and the subsequent data analytics and processing in the UV space may facilitate data storage, compression, and coding of 3D dataset of a mesh or a sequence of mesh, as described in further detail below. A mapped UV space dataset may be referred to as a UV image, or 2D map, or a 2D image of the mesh.

Following the mapping of the vertices and sampled surface points in the 3D mesh into the 2D UV space, some pixels may be mapped to the vertices and sampled surface points of the 3D mesh whereas other pixels may not be mapped. Each mapped pixel in a 2D image of the mesh may be associated with information of the corresponding mapped vertices or surface points in the 3D mesh. Depending on types of information included for the pixels in the UV space, various 2D images or 2D maps of the mesh may be constructed. A collection of multiple 2D maps may be used as alternative or/and joint representations of the mesh.

For example, the simplest 2D map for the mesh may be constructed as an occupancy map. The occupancy map may indicate the pixels in the UV space that are mapped to 3D vertices or sampled surface points of the mesh. The indication of occupancy may be represented by a binary indicator at each of the 2D pixels with, for example, binary value "1" indicating a mapping or occupancy and binary value "0" indicating a non-mapping or non-occupancy. As such, the occupancy map may be constructed as a 2D image. While a normal 2D image contains an array of three channels (RGB, YUV, YCrCb, and the like) with a color depth of, e.g., 8-bit, such 2D occupancy map of a mesh only needs a single-bit binary channel.

For another example, a 2D geometry map may be constructed for the mesh. A 2D geometry map, instead of containing a single binary channel, would be a full three-channel image where the three-color channels at each of the occupied pixel would correspond to the three 3D coordinates of the corresponding mapped vertex or sampled 3D points in the mesh.

In some implementations, other 2D maps may be constructed for the mesh. For example, a set of attributes for each of the vertices and the sampled 3D points of the mesh may be extracted from the mesh dataset and may be coded into the 3 color channels of a 2D maps image. Such a 2D map may be referred to as an attribute map of the mesh. A specific attribute map may contain three-channel colors for each of the occupied pixels in the UV space. For another example, texture attributes associated with each mapped vertices or sampled 3D point of the mesh may be parameterized into three-channel values and coded into a 2D attribute map. For another example, normal attributes associated with each mapped vertices or sampled 3D point of the mesh may be parameterized into three-channel values and coded into a 2D attribute map. In some example implementations, multiple 2D attribute maps may be constructed in order to hold all necessary attribute information of the vertices and the sampled surface points of the mesh.

The 2D maps above are merely examples. Other types of 2D maps for the mesh can be constructed. In addition, other datasets may be extracted from the 3D mesh to go along with the 2D maps above to jointly represent the original 3D mesh. For example, the connection or connectivity information between vertices may be separately grouped and organized aside from the 2D maps in forms of a list, table, and the like. The connectivity information, for example, may refer to vertices using vertex indices. The vertex indices may be mapped to their corresponding pixel position in the 2D maps. For another example, surface textures, colors, normals, displacements, and other information may be separately extracted and organized aside from the 2D maps rather than as a 2D map. Other meta data may be further extracted from the 3D mesh to represent the 3D mesh in conjunction with the 2D maps and the other datasets above.

While the example implementations above has focused on a mesh that is static, according to an aspect of the disclosure, 3D meshes may be dynamic. A dynamic mesh, for example, may refer to a mesh where at least one of the components (geometry information, connectivity information, mapping information, vertex attributes and attribute maps) varies with time. As such, a dynamic mesh can be described by a sequence of meshes or meshes (also referred to as mesh frames), analogous to a timed sequence of 2D image frames that form a video.

In some example implementations, a dynamic mesh may have constant connectivity information, time varying geometry and time varying vertex attributes. In some other examples, a dynamic mesh can have time varying connectivity information. In some examples, digital 3D content creation tools may be used to generate dynamic meshes with time varying attribute maps and time varying connectivity information. In some other examples, volumetric acquisition/detection/sensing techniques are used to generate dynamic meshes. The volumetric acquisition techniques can generate a dynamic mesh with time varying connectivity information especially under real-time constraints.

A dynamic mesh may require a large amount of data since the dynamic mesh may include a significant amount of information changing over time. However, compression may be performed to take advantage of redundancies within a mesh frame (intra-compression) and between mesh frames (inter-compression). Various mesh compression processes may be implemented to allow efficient storage and transmission of media contents in the mesh representation, particularly for a mesh sequence.

Aspects of the disclosure provide example architectures and techniques for mesh compression. The techniques may be used for various mesh compression including but not limited to static mesh compression, dynamic mesh compression, compression of a dynamic mesh with constant connectivity information, compression of a dynamic mesh with time varying connectivity information, compression of a dynamic mesh with time varying attribute maps, and the like. The techniques may be used in lossy and lossless compression for various applications, such as real-time immersive communications, storage, free viewpoint video, augmented reality (AR), virtual reality (VR), and the like. The applications may include functionalities such as random access and scalable/progressive coding.

While this disclosure explicitly describes techniques and implementations applicable to 3D meshes, the principles underlying the various implementations described herein are applicable to other types of 3D data structures, including but not limited to Point Cloud (PC) data structures. For simplicity, references to 3D meshes below are intended to be general and include other type of 3D representations such as point clouds and other 3D volumetric datasets.

Turning first to example architectural level implementations, FIG. 1 illustrates a simplified block diagram of a communication system (100) according to an example embodiment of the present disclosure. The communication system (100) may include a plurality of terminal devices that can communicate with one another, via, for example, a communication network (150) (alternatively referred to as a network). For example, the communication system (100) may include a pair of terminal devices (110) and (120) interconnected via the network (150). In the example of FIG. 1, the first pair of terminal devices (110) and (120) may perform unidirectional transmission of 3D meshes. For example, the terminal device (110) may compress a 3D mesh or a sequence of 3D meshes, which may be generated by the terminal device (110) or obtained from a storage or captured by a 3D sensor (105) connected with the terminal device (110). The compressed 3D mesh or sequence of 3D meshes may be transmitted, for example in the form of a bitstream (also referred as a coded bitstream), to the other terminal device (120) via the network (150). The terminal device (120) may receive the compressed 3D mesh or sequence of 3D meshes from the network (150), decompress the bitstream to reconstruct the original 3D mesh or sequence of 3D meshes, and suitably process the reconstructed 3D mesh or sequence of 3D meshes for display or for other purposes/uses. Unidirectional data transmission may be common in media serving applications and the like.

In the example of FIG. 1, either one or both of the terminal devices (110) and (120) may be implemented as servers, fixed or mobile personal computers, laptop computers, tablet computers, smart phones, gaming terminals, media players, and/or dedicated three-dimensional (3D) equipment and the like, but the principles of the present disclosure may be not so limited. The network (150) may represent any type of network or combination of networks that transmit compressed 3D meshes between the terminal devices (110) and (120). The network (150) can include, for example, wireline (wired) and/or wireless communication networks. The network (150) may exchange data in circuit-switched and/or packet-switched channels. Representative networks include long-haul telecommunications networks, local area networks, wide area networks, cellular networks, and/or the Internet. For the purposes of the present disclosure, the architecture and topology of the network (150) may be immaterial to the operation of the present disclosure unless explained herein below.

Figure 2:
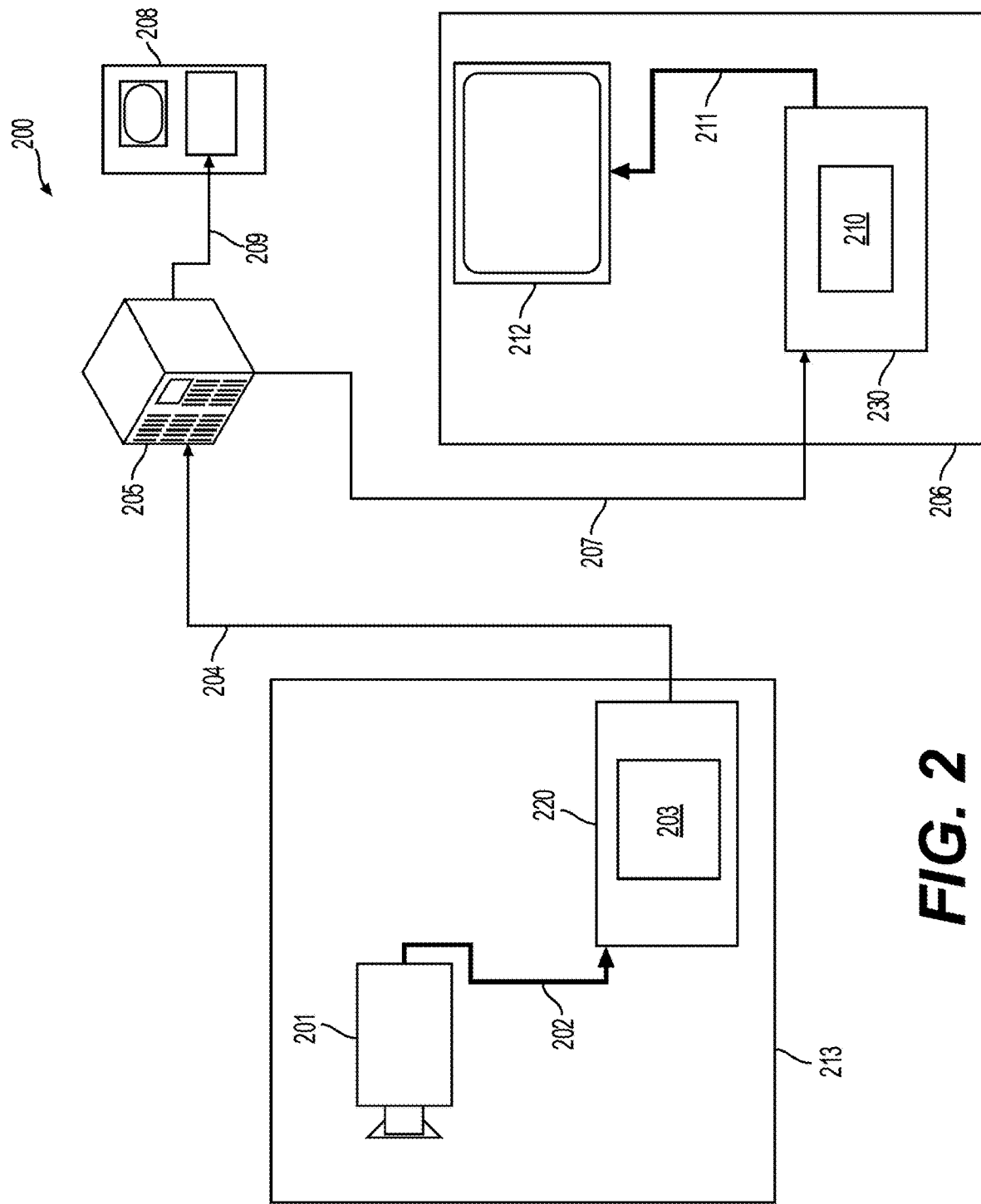
FIG. 2 is a schematic illustration of a simplified block diagram of a streaming system in accordance with an embodiment.

FIG. 2 illustrates an example simplified block diagram of a streaming system (200) in accordance with an embodiment of this disclosure. The FIG. 2 illustrates an example application for the disclosed implementations related to 3D meshes and compressed 3D meshes. The disclosed subject matter can be equally applicable to other 3D mesh or point cloud enabled applications, such as, 3D telepresence application, virtual reality application, and the like.

The streaming system (200) may include a capture or storage subsystem (213). The capture or storage subsystem (213) may include 3D mesh generator or storage medium (201), e.g., a 3D mesh or point cloud generation tool/software, a graphics generation component, or a point cloud sensor such as a light detection and ranging (LIDAR) systems, 3D cameras, 3D scanners, a 3D mesh store and the like that generate or provide 3D mesh (202) or point clouds (202) that are uncompressed. In some example implementations, the 3D meshes (202) include vertices of a 3D mesh or 3D points of a point cloud (both referred to as 3D mesh). The 3D meshes (202), depicted as a bold line to emphasize a corresponding high data volume when compared to compressed 3D meshes (204) (a bitstream of compressed 3D meshes). The compressed 3D meshes (204) may be generated by an electronic device (220) that includes an encoder (203) coupled to the 3D meshes (202). The encoder (203) can include hardware, software, or a combination thereof to enable or implement aspects of the disclosed subject matter as described in more detail below. The compressed 3D meshes (204) (or bitstream of compressed 3D meshes (204)), depicted as a thin line to emphasize the lower data volume when compared to the stream of uncompressed 3D meshes (202), can be stored in a streaming server (205) for future use. One or more streaming client subsystems, such as client subsystems (206) and (208) in FIG. 2 can access the streaming server (205) to retrieve copies (207) and (209) of the compressed 3D meshes (204). A client subsystem (206) may include a decoder (210), for example, in an electronic device (230). The decoder (210) may be configured to decode the incoming copy (207) of the compressed 3D meshes and create an outgoing stream of reconstructed 3D meshes (211) that can be rendered on a rendering device (212) or for other uses.

It is noted that the electronic devices (220) and (230) can include other components (not shown). For example, the electronic device (220) can include a decoder (not shown) and the electronic device (230) can include an encoder (not shown) as well.

In some streaming systems, the compressed 3D meshes (204), (207), and (209) (e.g., bitstreams of compressed 3D meshes) can be compressed according to certain standards. In some examples, as described in further detail below, video coding standards are used to take advantage of redundancies and correlations in the compression of 3D meshes after the 3D mesh is first projected to mapped into 2D representations suitable for video compression. Non-limiting examples of those standards include, High Efficiency Video Coding (HEVC), Versatile Video Coding (VVC), and the like, as described in further detail below.

Figure 3:
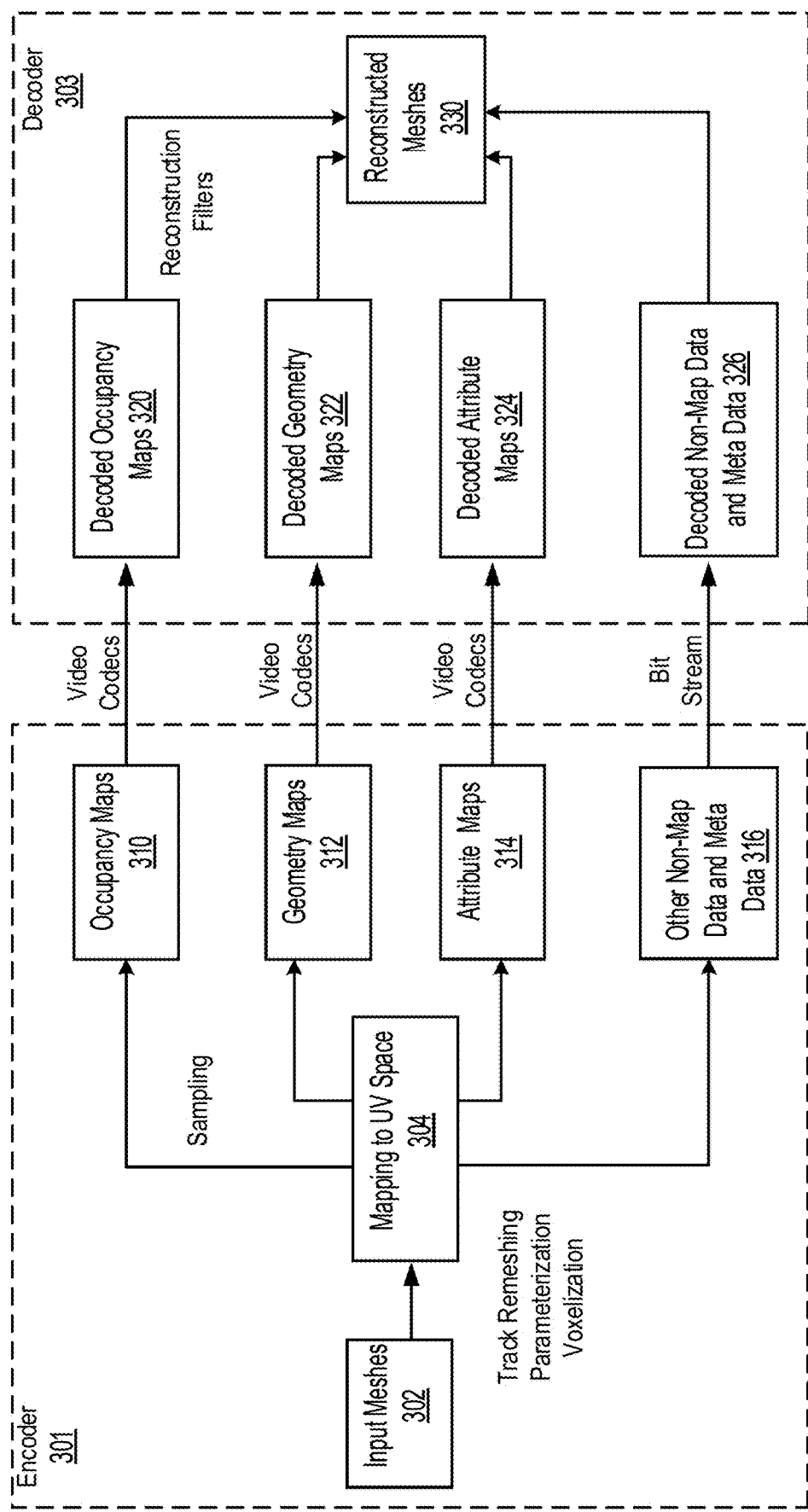
FIG. 3 shows a block diagram of an encoder for encoding mesh frames, according to some embodiments.

The compressed 3D mesh or sequence of 3D meshes may be generated by an encoder whereas a decoder may be configured to decompressed the compressed or coded 3D meshes. FIG. 3 illustrates a high-level example data flow of 3D meshes in such an encoder (301) and decoder (303). As shown in FIG. 3, a raw input 3D mesh or a sequence of 3D meshes (302) may be preprocessed by track remeshing, parameterization, and/or voxelization to generate input data to a mapping unit for mapping the 3D meshes to a 2D UV space (304), which, in some implementations, may include meshes with UV atlas. The 3D meshes may be sampled to include 3D surface points that may not be among the vertices and add these sampled 3D surface points in the mapping to the UV space. Various 2D maps may be generated in the encoder 301, including but not limited to occupancy maps (310), geometry maps (312), attribute maps (314). These image type of maps may be compressed by the encoder 301 using, for example, video coding/compression technologies. For example, a video coder may help compressing a 3D mesh frame using intra-prediction techniques and inter-prediction by other 3D mesh reference frames. Other non-image or non-map data or meta data (316) may also be coded in various manner to remove redundancies to generate compressed non-map data, for non-limiting example, via entropy coding. The encoder 301 may then combine or multiplex the compressed 2D maps and non-map data and further coding the combined data to generate an encoded bitstream (or referred as coded bitstream). The encoded bitstream may then be stored or transmitted for use by the decoder 303. The decoder may be configured to decode the bitstream, demultiplex the decoded bitstream to obtain the compressed 2D maps and non-map data, and preform decompression to generate decoded occupancy maps (320), decoded geometry maps (322), decoded attribute maps (324), and decoded non-map data and meta data (326). The decoder 303 may then further be configured to reconstruct the 3D mesh or sequence of 3D meshes (330) from the decoded 2D maps (320, 322, and 324) and decoded non-map data (326).

Figure 4:
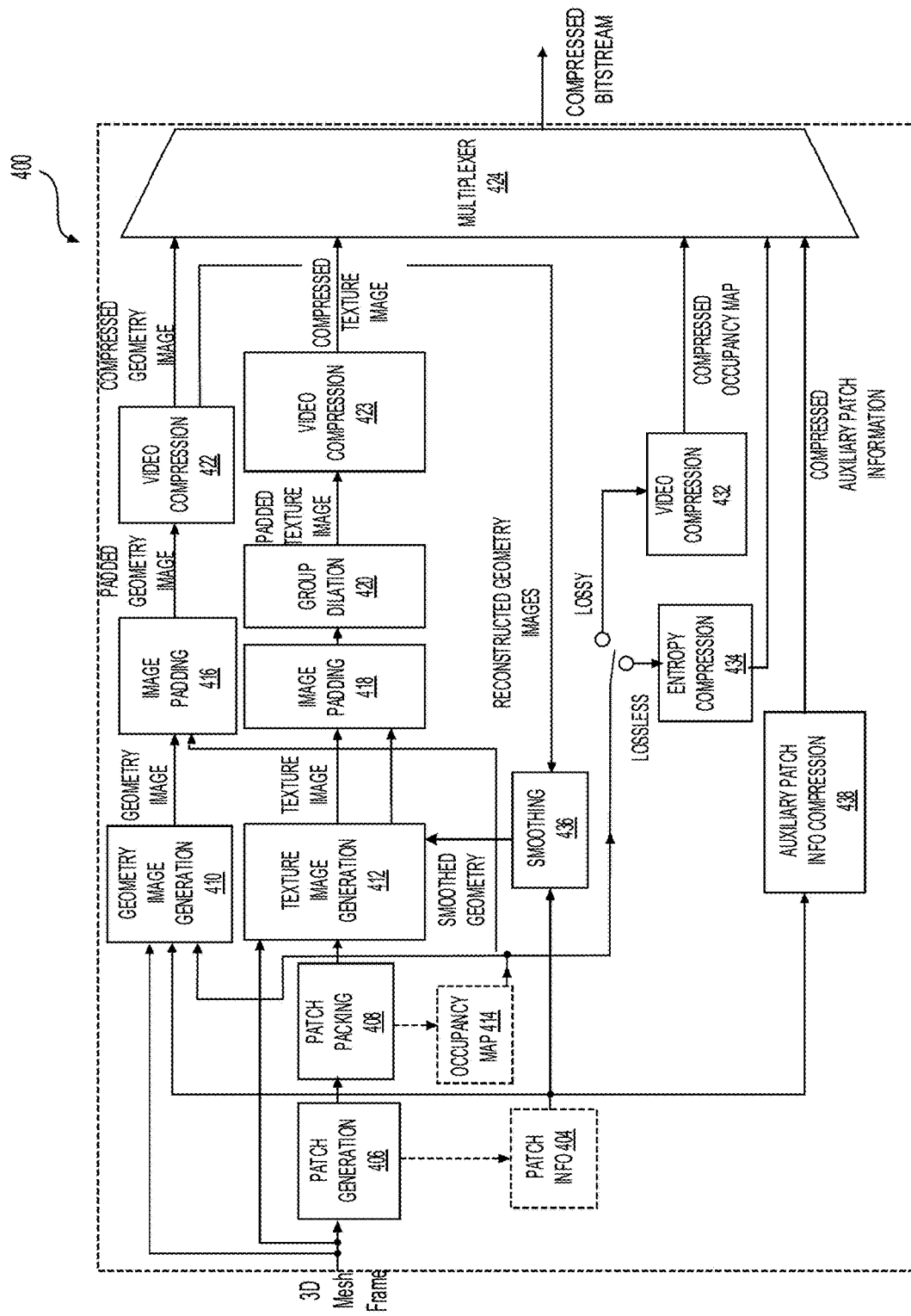
FIG. 4 shows a block diagram of a decoder for decoding a compressed bitstream corresponding to mesh frames according to some embodiments.

In further detail, FIG. 4 shows a block diagram of an example 3D mesh encoder (400) for encoding 3D mesh frames, according to some embodiments of this disclosure.

In some example implementations, the mesh encoder (400) may be used in the communication system (100) and streaming system (200). For example, the encoder (203) can be configured and operate in a similar manner as the mesh encoder (400).

The mesh encoder (400) may receive 3D mesh frames as uncompressed inputs and generate bitstream corresponding to compressed 3D mesh frames. In some example implementations, the mesh encoder (400) may receive the 3D mesh frames from any source, such as the mesh or point cloud source (201) of FIG. 2 and the like.

In the example of FIG. 4, the mesh encoder (400) may include a patch generation module (406) (alternatively referred to chart generation module), a patch packing module (408), a geometry image generation module (410), a texture image generation module (412), a patch info module (404), an occupancy map module (414), a smoothing module (436), image padding modules (416) and (418), a group dilation module (420), video compression modules (422), (423) and (432), an auxiliary patch info compression module (438), an entropy compression module (434), and a multiplexer (424).

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also may apply to the term module and other equivalent terms (e.g., unit).

According to an aspect of the disclosure, and as descried above, the mesh encoder (400), converts 3D mesh frames into image-based representations (e.g., 2D maps) along with some non-map meta data (e.g., patch or chart info) that is used to assist converting the compressed 3D mesh back into a decompressed 3D mesh. In some examples, the mesh encoder (400) may convert 3D mesh frames into 2D geometry maps or images, texture maps or images and occupancy maps or images, and then use video coding techniques to encode the geometry images, texture images and occupancy maps into a bitstream along with the meta data and other compressed non-map data. Generally, and as described above, a 2D geometry image is a 2D image with 2D pixels filled with geometry values associated with 3D points projected (the term "projected" is used to mean "mapped") to the 2D pixels, and a 2D pixel filled with a geometry value may be referred to as a geometry sample. A texture image is a 2D image with pixels filled with texture values associated with 3D points projected to the 2D pixels, and a 2D pixel filled with a texture value may be referred to as a texture sample. An occupancy map is a 2D image with 2D pixels filled with values that indicate occupation or non-occupation by 3D points.

The patch generation module (406) segments a 3D mesh into a set of charts or patches (e.g., a patch is defined as a contiguous subset of the surface described by the 3D mesh or point cloud), which may be overlapping or not, such that each patch may be described by a depth field with respect to a plane in 2D space (e.g., flattening of the surface such that deeper 3D points on the surface is further away from center of the corresponding 2D map). In some embodiments, the patch generation module (406) aims at decomposing the 3D mesh into a minimum number of patches with smooth boundaries, while also minimizing the reconstruction error.

The patch info module (404) can collect the patch information that indicates sizes and shapes of the patches. In some examples, the patch information can be packed into a data frame and then encoded by the auxiliary patch info compression module (438) to generate the compressed auxiliary patch information. The auxiliary patch compression may be implemented in various forms, including but not limited to various types of arithmetic coding.

The patch or chart packing module (408) may be configured to map the extracted patches onto a 2D grid of the UV space while minimize the unused space. In some example implementations, the pixels of the 2D UV space may granularized to blocks of pixels for mapping of the patches or charts. The block size may be predefined. For example, the block size may be M be M×M (e.g., 16×16). With such granularity, it may be guaranteed that every M×M block of the 2D UV grid is associated with a unique patch. In other words, each patch is mapped to the 2D UV space with a 2D granularity of M×M. Efficient patch packing can directly impact the compression efficiency either by minimizing the unused space or ensuring temporal consistency. Examples implementations of packing of the patches or charts into the 2D UV space are given in further detail below.

The geometry image generation module (410) can generate 2D geometry images associated with geometry of the 3D mesh at given patch locations in the 2D grid. The texture image generation module (412) can generate 2D texture images associated with texture of the 3D mesh at given patch locations in the 2D grid. The geometry image generation module (410) and the texture image generation module (412) essentially exploit the 3D to 2D mapping computed during the packing process above to store the geometry and texture of the 3D mesh as 2D images, as described above.

In some implementations, in order to better handle the case of multiple points being projected to the same sample (e.g., the patches overlap in the 3D space of the mesh), the 2D image may be layered. In other words, each patch may be projected onto, e.g., two images, referred to as layers, such that the multiple points can be projected into the same points in the different layers.

In some example implementations, a geometry image may be represented by a monochromatic frame of width× height (W×H). As such, three geometry images of the 3 luma or chroma channels may be used to represents the 3D coordinates. In some example implementations, a geometry image may be represented by a 2D image having three channels (RGB, YUV, YCrCb, and the like) with a certain color depth (e.g., 8-bit, 12-bit, 16-bit, or the like). As such, one geometry image having the 3 color channels may be used to represents the 3D coordinates.

To generate the texture image, the texture generation procedure exploits the reconstructed/smoothed geometry in order to compute the colors to be associated with the sampled points from the original 3D mesh (see "sampling" of FIG. 3, which, for example, would generate 3D surface points not among the vertices of the original 3D mesh).

The occupancy map module (414) may be configured to generate an occupancy map that describes padding information at each unit. For example, as described above, the occupancy image may include a binary map that indicates for each cell of the 2D grid whether the cell belongs to the empty space or to the 3D mesh. In some example implementations, the occupancy map may use binary information to describe for each pixel whether the pixel is padded or not. In some other example implementations, the occupancy map may use binary information to describe for each block of pixels (e.g., each M×M block) whether the block of pixels is padded or not.

The occupancy map generated by the occupancy map module (414) may be be compressed using lossless coding or lossy coding. When lossless coding is used, the entropy compression module (434) may be used to compress the occupancy map. When lossy coding is used, the video compression module (432) may be used to compress the occupancy map.

It is noted that the patch packing module (408) may leave some empty spaces between 2D patches packed in an image frame. The image padding modules (416) and (418) may fill the empty spaces (referred to as padding) in order to generate an image frame that may be suited for 2D video and image codecs. The image padding is also referred to as background filling which can fill the unused space with redundant information. In some examples, a well-implemented background filling minimally increases the bit rate while avoiding introducing significant coding distortion around the patch boundaries.

The video compression modules (422), (423), and (432) can encode the 2D images, such as the padded geometry images, padded texture images, and occupancy maps based on a suitable video coding standard, such as HEVC, VVC and the like. In some example implementations, the video compression modules (422), (423), and (432) are individual components that operate separately. It is noted that the video compression modules (422), (423), and (432) can be implemented as a single component in some other example implementations.

In some example implementations, the smoothing module (436) may be configured to generate a smoothed image of the reconstructed geometry image. The smoothed image can be provided to the texture image generation (412). Then, the texture image generation (412) may adjust the generation of the texture image based on the reconstructed geometry images. For example, when a patch shape (e.g. geometry) is slightly distorted during encoding and decoding, the distortion may be taken into account when generating the texture images to correct for the distortion in the patch shape.

In some embodiments, the group dilation (420) is configured to pad pixels around the object boundaries with redundant low-frequency content in order to improve coding gain as well as visual quality of reconstructed 3D mesh.

The multiplexer (424) may be configured to multiplex the compressed geometry image, the compressed texture image, the compressed occupancy map, the compressed auxiliary patch information into a compressed bitstream (or referred as coded bitstream).

Figure 5:
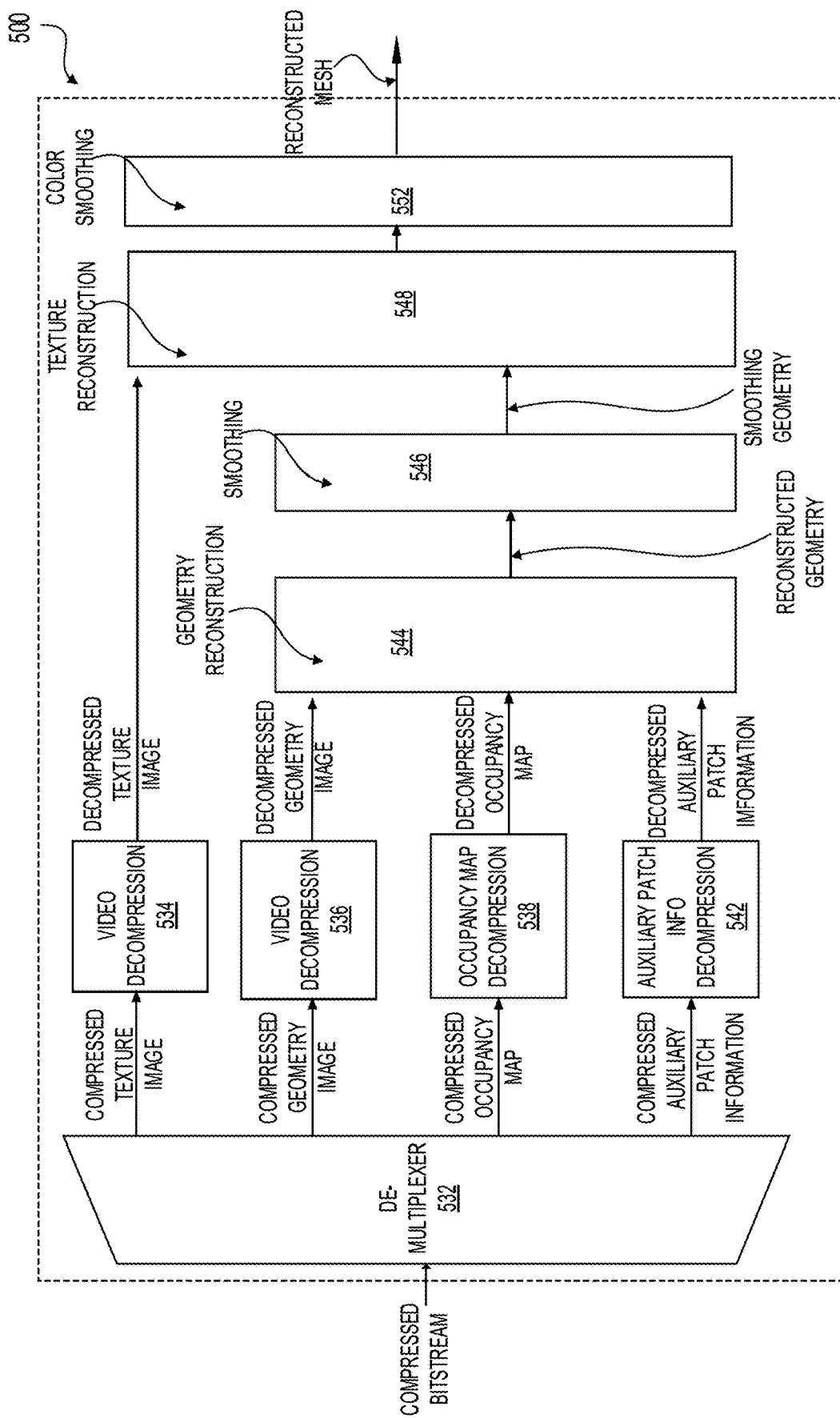
FIG. 5 is a schematic illustration of a simplified block diagram of a video decoder in accordance with an embodiment.

FIG. 5 shows a block diagram of an example mesh decoder (500) for decoding compressed bitstream corresponding to 3D mesh frames, according to some embodiments of this disclosure. In some example implementations, the mesh decoder (500) can be used in the communication system (100) and streaming system (200). For example, the decoder (210) can be configured to operate in a similar manner as the mesh decoder (500). The mesh decoder (500) receives the compressed bitstream, and generates reconstructed 3D meshes based on the compressed bitstream including, for example, the compressed geometry image, the compressed texture image, the compressed occupancy map, the compressed auxiliary patch information.

In the example of FIG. 5, the mesh decoder (500) may include a de-multiplexer (532), video decompression modules (534) and (536), an occupancy map decompression module (538), an auxiliary patch-information decompression module (542), a geometry reconstruction module (544), a smoothing module (546), a texture reconstruction module (548), and a color smoothing module (552).

The de-multiplexer (532) may receive and separate the compressed bitstream into compressed texture image, compressed geometry image, compressed occupancy map, and compressed auxiliary patch information.

The video decompression modules (534) and (536) can decode the compressed images according to a suitable standard (e.g., HEVC, VVC, etc.) and output decompressed images. For example, the video decompression module (534) may decode the compressed texture images and output decompressed texture images. The video decompression module (536) may further decode the compressed geometry images and outputs the decompressed geometry images.

The occupancy map decompression module (538) may be configured to decode the compressed occupancy maps according to a suitable standard (e.g., HEVC, VVC, etc.) and output decompressed occupancy maps.

The auxiliary patch-information decompression module (542) may be configured to decode the compressed auxiliary patch information according to a suitable decoding algorithm and output decompressed auxiliary patch information.

The geometry reconstruction module (544) may be configured to receive the decompressed geometry images, and generate reconstructed 3D mesh geometry based on the decompressed occupancy map and decompressed auxiliary patch information.

The smoothing module (546) may be configured to smooth incongruences at edges of patches. The smoothing procedure may be aimed at alleviating potential discontinuities that may arise at the patch boundaries due to compression artifacts. In some example implementations, a smoothing filter may be applied to the pixels located on the patch boundaries to alleviate the distortions that may be caused by the compression/decompression.

The texture reconstruction module (548) may be configured to determine texture information for points in the 3D meshes based on the decompressed texture images and the smoothing geometry.

The color smoothing module (552) may be configured to smooth incongruences of coloring. Non-neighboring patches in 3D space are often packed next to each other in 2D videos. In some examples, pixel values from non-neighboring patches might be mixed up by the block-based video codec. The goal of color smoothing may be to reduce the visible artifacts that appear at patch boundaries.

Figure 6:
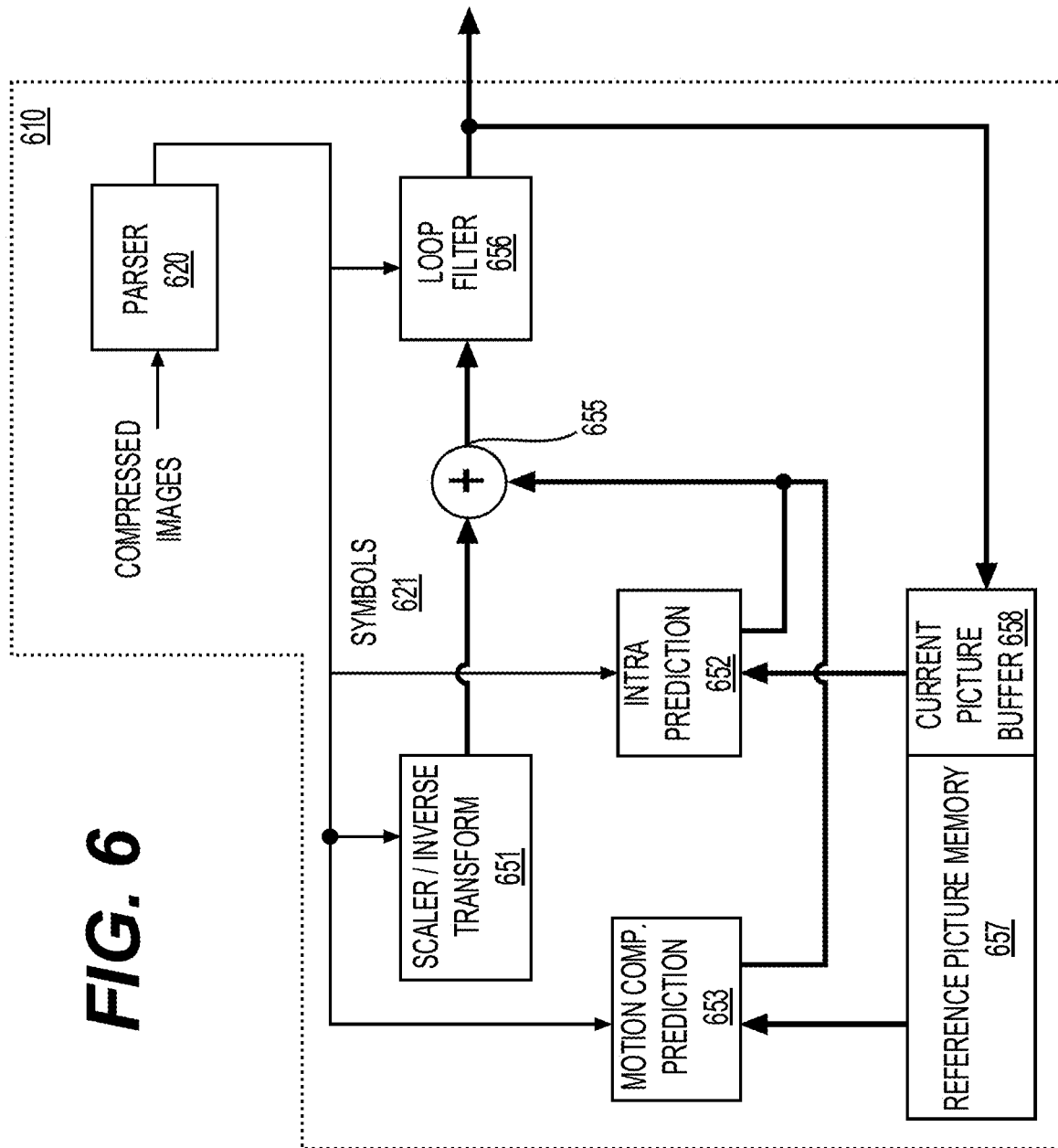
FIG. 6 is a schematic illustration of a simplified block diagram of a video encoder in accordance with an embodiment.

FIG. 6 shows a block diagram of an example video decoder (610) according to an embodiment of the present disclosure. The video decoder (610) may be used in the mesh decoder (500). For example, the video decompression modules (534) and (536), the occupancy map decompression module (538) may be similarly configured as the video decoder (610).

The video decoder (610) may include a parser (620) to reconstruct symbols (621) from compressed images, such as the coded video sequence. Categories of those symbols may include information used to manage operation of the video decoder (610). The parser (620) may parse/entropy-decode the coded video sequence being received. The coding of the coded video sequence can be in accordance with a video coding technology or standard, and can follow various principles, including variable length coding, Huffman coding, arithmetic coding with or without context sensitivity, and so forth. The parser (620) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (620) may also extract from the coded video sequence information such as transform coefficients, quantizer parameter values, motion vectors, and so forth.

The parser (620) may perform an entropy decoding/parsing operation on the image sequence received from a buffer memory, so as to create symbols (621).

Reconstruction of the symbols (621) can involve multiple different units depending on the type of the coded video picture or parts thereof (such as: inter and intra picture, inter and intra block), and other factors. Which units are involved, and how, may be controlled by the subgroup control information that was parsed from the coded video sequence by the parser (620). The flow of such subgroup control information between the parser (620) and the multiple units below is not depicted for clarity.

Beyond the functional blocks already mentioned, the video decoder (610) can be conceptually subdivided into a number of functional units as described below. In a practical implementation operating under commercial constraints, many of these units interact closely with each other and can, at least partly, be integrated into each other. The conceptual subdivision into the functional units below is made merely for the purpose of describing the disclosed subject matter.

The video decoder (610) may include a scaler/inverse transform unit (651). The scaler/inverse transform unit (651) may receive a quantized transform coefficient as well as control information, including which transform to use, block size, quantization factor, quantization scaling matrices, etc. as symbol(s) (621) from the parser (620). The scaler/inverse transform unit (651) may output blocks comprising sample values that can be input into aggregator (655).

In some cases, the output samples of the scaler/inverse transform (651) can pertain to an intra coded block; that is: a block that is not using predictive information from previously reconstructed pictures, but can use predictive information from previously reconstructed parts of the current picture. Such predictive information can be provided by an intra picture prediction unit (652). In some cases, the intra picture prediction unit (652) may generate a block of the same size and shape of the block under reconstruction, using surrounding already reconstructed information fetched from the current picture buffer (658). The current picture buffer (658) may buffer, for example, partly reconstructed current picture and/or fully reconstructed current picture. The aggregator (655), in some cases, may add, on a per sample basis, the prediction information that the intra prediction unit (652) has generated to the output sample information as provided by the scaler/inverse transform unit (651).

In other cases, the output samples of the scaler/inverse transform unit (651) can pertain to an inter coded, and potentially motion compensated block. In such a case, a motion compensation prediction unit (653) can access reference picture memory (657) to fetch samples used for prediction. After motion compensating the fetched samples in accordance with the symbols (621) pertaining to the block, these samples may be added by the aggregator (655) to the output of the scaler/inverse transform unit (651) (in this case called the residual samples or residual signal) so as to generate output sample information. The addresses within the reference picture memory (657) from where the motion compensation prediction unit (653) fetches prediction samples can be controlled by motion vectors, available to the motion compensation prediction unit (653) in the form of symbols (621) that can have, for example X, Y, and reference picture components. Motion compensation also may include interpolation of sample values as fetched from the reference picture memory (657) when sub-sample exact motion vectors are in use, motion vector prediction mechanisms, and so forth.

The output samples of the aggregator (655) may be subject to various loop filtering techniques in the loop filter unit (656). Video compression technologies may include in-loop filter technologies that are controlled by parameters included in the coded video sequence (also referred to as coded video bitstream) and made available to the loop filter unit (656) as symbols (621) from the parser (620), but may also be responsive to meta-information obtained during the decoding of previous (in decoding order) parts of the coded picture or coded video sequence, as well as responsive to previously reconstructed and loop-filtered sample values.

The output of the loop filter unit (656) may be a sample stream that can be output to a render device as well as stored in the reference picture memory (657) for use in future inter-picture prediction.

Certain coded pictures, once fully reconstructed, may be used as reference pictures for future prediction. For example, once a coded picture corresponding to a current picture is fully reconstructed and the coded picture has been identified as a reference picture (by, for example, the parser (620)), the current picture buffer (658) may become a part of the reference picture memory (657), and a fresh current picture buffer may be reallocated before commencing the reconstruction of the following coded picture.

The video decoder (610) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile may select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 7:
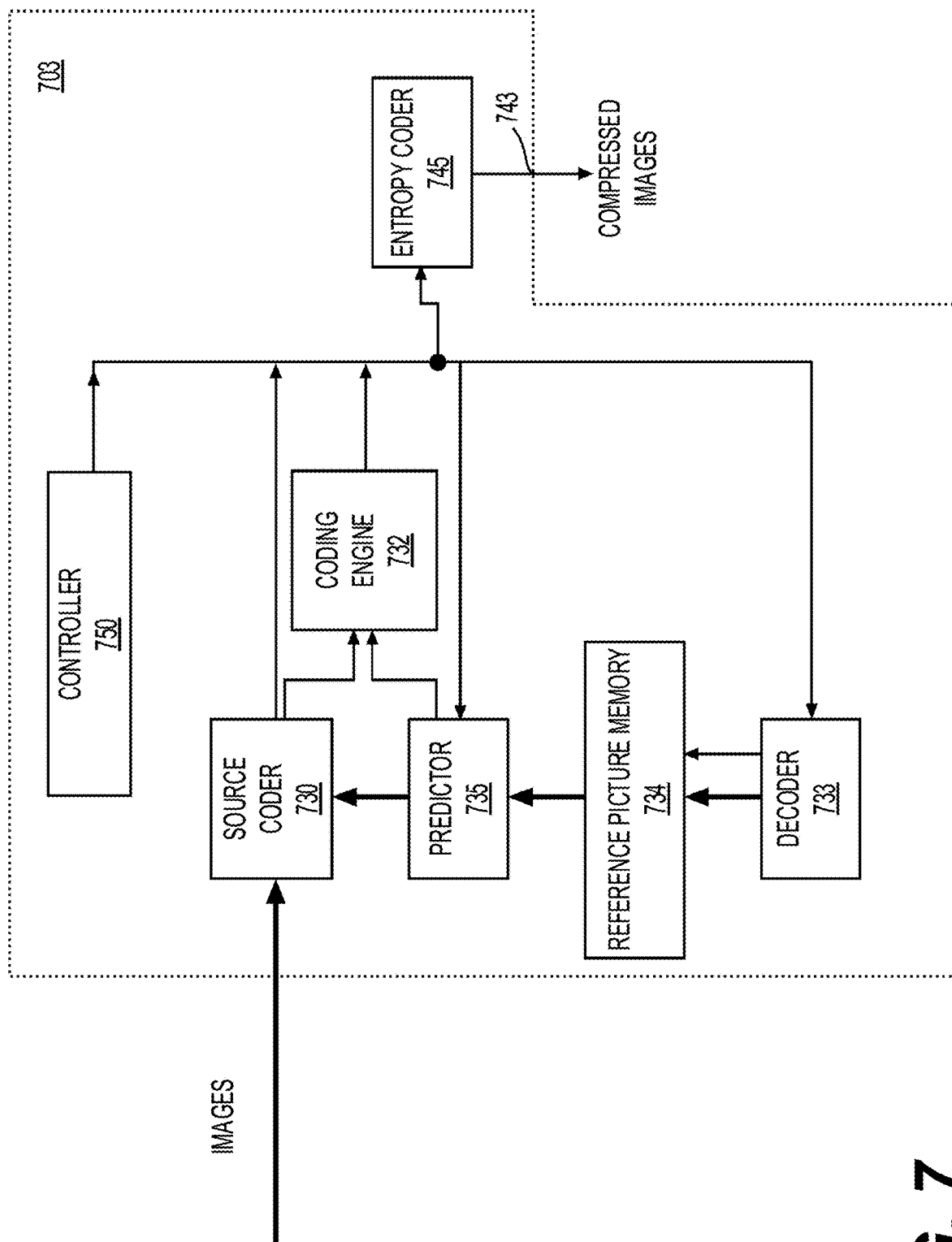
FIG. 7 shows a block diagram of an encoder for encoding mesh frames, according to some embodiments.

FIG. 7 shows a block diagram of a video encoder (703) according to an embodiment of the present disclosure. The video encoder (703) can be used in the mesh encoder (400) that compresses 3D meshes or point clouds. In some example implementations, the video compression module (422) and (423), and the video compression module (432) are configured similarly to the encoder (703).

The video encoder (703) may receive 2D images, such as padded geometry images, padded texture images and the like, and generate compressed images.

According to an example embodiment of this disclosure, the video encoder (703) may code and compress the pictures of the source video sequence (images) into a coded video sequence (compressed images) in real-time or under any other time constraints as required by the application. Enforcing appropriate coding speed is one function of a controller (750). In some embodiments, the controller (750) controls other functional units as described below and is functionally coupled to the other functional units. The coupling is not depicted for clarity. Parameters set by the controller (750) can include rate control related parameters (picture skip, quantizer, lambda value of rate-distortion optimization techniques, . . . ), picture size, group of pictures (GOP) layout, maximum motion vector search range, and so forth. The controller (750) may be configured to have other suitable functions that pertain to the video encoder (703) optimized for a certain system design.

In some example implementations, the video encoder (703) may be configured to operate in a coding loop. As an oversimplified description, in an example, the coding loop may include a source coder (730) (e.g., responsible for creating symbols, such as a symbol stream, based on an input picture to be coded, and a reference picture(s)), and a (local) decoder (733) embedded in the video encoder (703). The decoder (733) may reconstruct the symbols to create the sample data in a similar manner as a (remote) decoder also would create (as any compression between symbols and coded video bitstream is lossless in the video compression technologies considered in the disclosed subject matter). The reconstructed sample stream (sample data) may be input to the reference picture memory (734). As the decoding of a symbol stream leads to bit-exact results independent of decoder location (local or remote), the content in the reference picture memory (734) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (733) can be the same as of a "remote" decoder, such as the video decoder (610), which has already been described in detail above in conjunction with FIG. 6. Briefly referring also to FIG. 6, however, as symbols are available and encoding/decoding of symbols to a coded video sequence by an entropy coder (745) and the parser (620) can be lossless, the entropy decoding parts of the video decoder (610), including and parser (620) may not be fully implemented in the local decoder (733).

In various embodiments in the present disclosure, any decoder technology except the parsing/entropy decoding that is present in a decoder also may necessarily need to be present, in substantially identical functional form, in a corresponding encoder. For this reason, the disclosed subject matter in various embodiments may focus on decoder operation. The description of encoder technologies may be abbreviated as they are the inverse of the comprehensively described decoder technologies. Only in certain areas a more detail description is required and provided below.

During operation, in some examples, the source coder (730) may perform motion compensated predictive coding, which codes an input picture predictively with reference to one or more previously-coded picture from the video sequence that were designated as "reference pictures". In this manner, the coding engine (732) may code differences between pixel blocks of an input picture and pixel blocks of reference picture(s) that may be selected as prediction reference(s) to the input picture.

The local video decoder (733) may decode coded video data of pictures that may be designated as reference pictures, based on symbols created by the source coder (730). Operations of the coding engine (732) may advantageously be lossy processes. When the coded video data may be decoded at a video decoder (not shown in FIG. 7), the reconstructed video sequence typically may be a replica of the source video sequence with some errors. The local video decoder (733) replicates decoding processes that may be performed by the video decoder on reference pictures and may cause reconstructed reference pictures to be stored in the reference picture cache (734). In this manner, the video encoder (703) may store copies of reconstructed reference pictures locally that have common content as the reconstructed reference pictures that will be obtained by a far-end video decoder (absent transmission errors).

The predictor (735) may perform prediction searches for the coding engine (732). That is, for a new picture to be coded, the predictor (735) may search the reference picture memory (734) for sample data (as candidate reference pixel blocks) or certain metadata such as reference picture motion vectors, block shapes, and so on, that may serve as an appropriate prediction reference for the new pictures. The predictor (735) may operate on a sample block-by-pixel block basis to find appropriate prediction references. In some cases, as determined by search results obtained by the predictor (735), an input picture may have prediction references drawn from multiple reference pictures stored in the reference picture memory (734).

The controller (750) may manage coding operations of the source coder (730), including, for example, setting of parameters and subgroup parameters used for encoding the video data.

Output of all aforementioned functional units may be subjected to entropy coding in the entropy coder (745). The entropy coder (745) may translate the symbols as generated by the various functional units into a coded video sequence, by lossless compressing the symbols according to technologies such as Huffman coding, variable length coding, arithmetic coding, and so forth.

The controller (750) may manage operation of the video encoder (703). During coding, the controller (750) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (703) may perform coding operations according to a predetermined video coding technology or standard, such as ITU-T Rec. H.265. In its operation, the video encoder (703) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

In various embodiments, the mesh encoder (400) and the mesh decoder (500) above can be implemented with hardware, software, or combination thereof. For example, the mesh encoder (400) and the mesh decoder (500) can be implemented with processing circuitry such as one or more integrated circuits (ICs) that operate with or without software, such as an application specific integrated circuit (ASIC), field programmable gate array (FPGA), and the like. In another example, the mesh encoder (400) and the mesh decoder (500) can be implemented as software or firmware including instructions stored in a non-volatile (or non-transitory) computer-readable storage medium. The instructions, when executed by processing circuitry, such as one or more processors, causing the processing circuitry to perform functions of the mesh encoder (400) and/or the mesh decoder (500).

Figure 8:
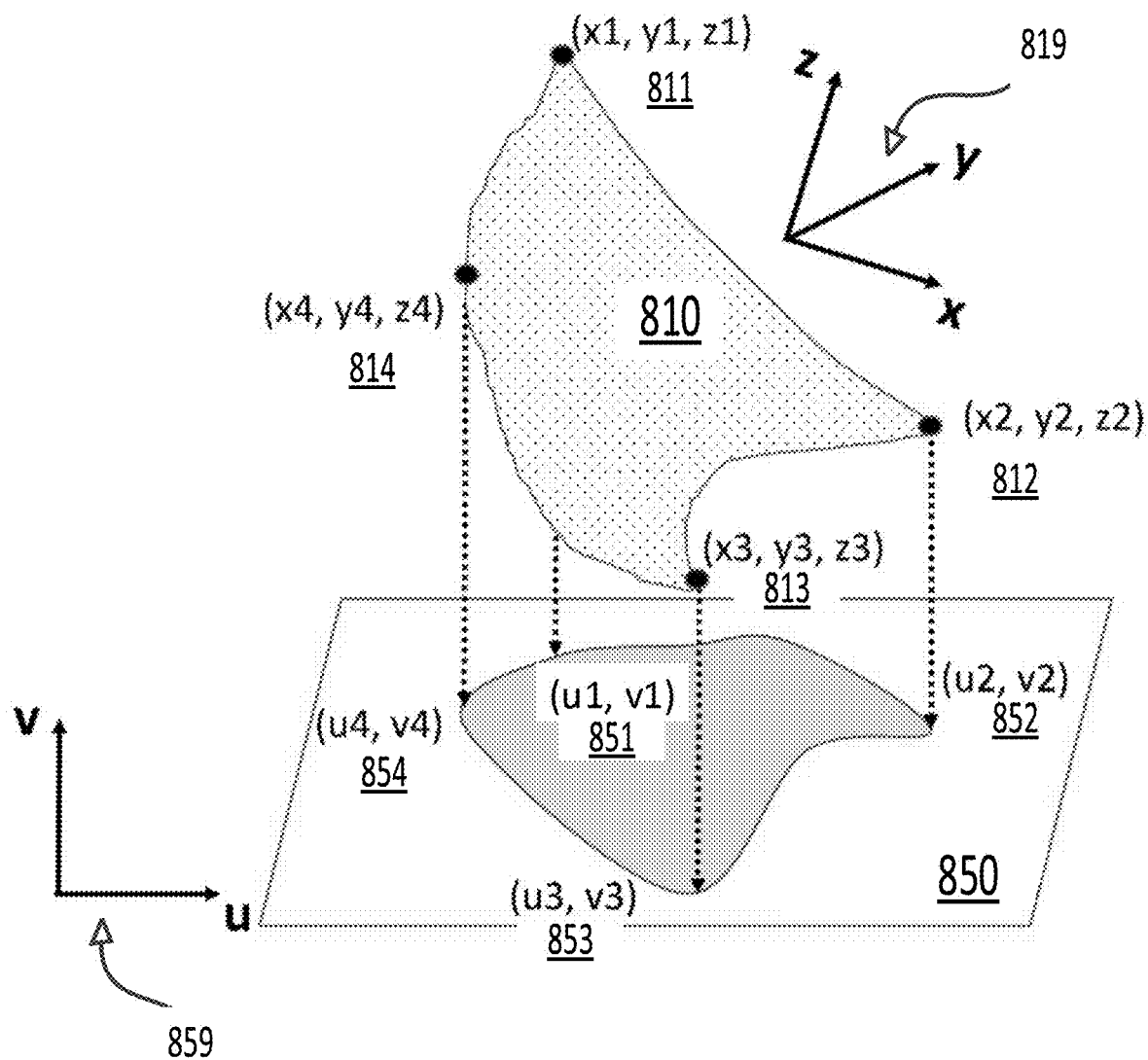
FIG. 8 shows a diagram of a framework for mesh compression according to some embodiments of the disclosure.

FIG. 8 shows an example of mapping a 3D patch (810) in a 3D x-y-z coordinate system (819) into a 2D UV plane (850) in a u-v coordinate system (859). In some implementations, a 3D patch (or simply a patch) generally may refer to a contiguous subset of the surface described by a set of vertices corresponding to a mesh in the 3D space. In a non-limiting example, the patch includes vertices with 3D coordinates, normal vectors, color, texture, and other information. In some implementations, a 2D geometry patch (or simply a geometry patch or a patch) may refer to a projected shape in a 2D UV plane, the projected shape corresponding to the patch, and the geometry patch corresponding to the patch.

In the projected shape in the UV plane, each mapped point (ui, vi) is corresponding to a 3D vertex with position (xi, yi, zi), wherein i=1, 2, 3, 4, etc. For example, a first vertex (811) with a 3D coordinate (x1, y1, z1) is mapped to a first point (851) with a 2D coordinate (u1, v1); a second vertex (812) with a 3D coordinate (x2, y2, z2) is mapped to a second point (852) with a 2D coordinate (u2, v2); a third vertex (813) with a 3D coordinate (x3, y3, z3) is mapped to a third point (853) with a 2D coordinate (u3, v3); a fourth vertex (814) with a 3D coordinate (x4, y4, z4) is mapped to a fourth point (854) with a 2D coordinate (u4, v4).

Coding of the vertex geometry (i.e., values of xi, yi, and zi) is then converted into coding the 3-channel values in the 2D plane, where each 3-channel value at a (u, v) position corresponds to the associated 3D position. For example, a pixel value of the first position (851) includes a 3-channel value (or three channel values) corresponding to the 3D coordinate of the first vertex (811), wherein a first channel value of the 3-channel value corresponds to the value of x1, a second channel value of the 3-channel value corresponds to the value of y1, and a third channel value of the 3-channel value corresponds to the value of z1.

The projected/mapped 2D plane with one or more patches is therefore referred to as a geometry image and may therefore be coded using any image or video codec, e.g., a video codec that supports 4:4:4 color formats.

In some implementations, pixel values of projected/mapped points on a UV plane may correspond to the distance from a 3D vertex to the UV plane. Therefore, to locate a vertex location information, multiple planes in different directions may be used for such projection. When this is the case, each position (or referred as point) in the UV plane is a 1-channel value, recording the distance. Such an image is referred to as a depth image. Depth images may be coded using any image or video codec, e.g., a video codec that supports YUV4:2:0 or YUV4:0:0 color formats.

Figure 9:
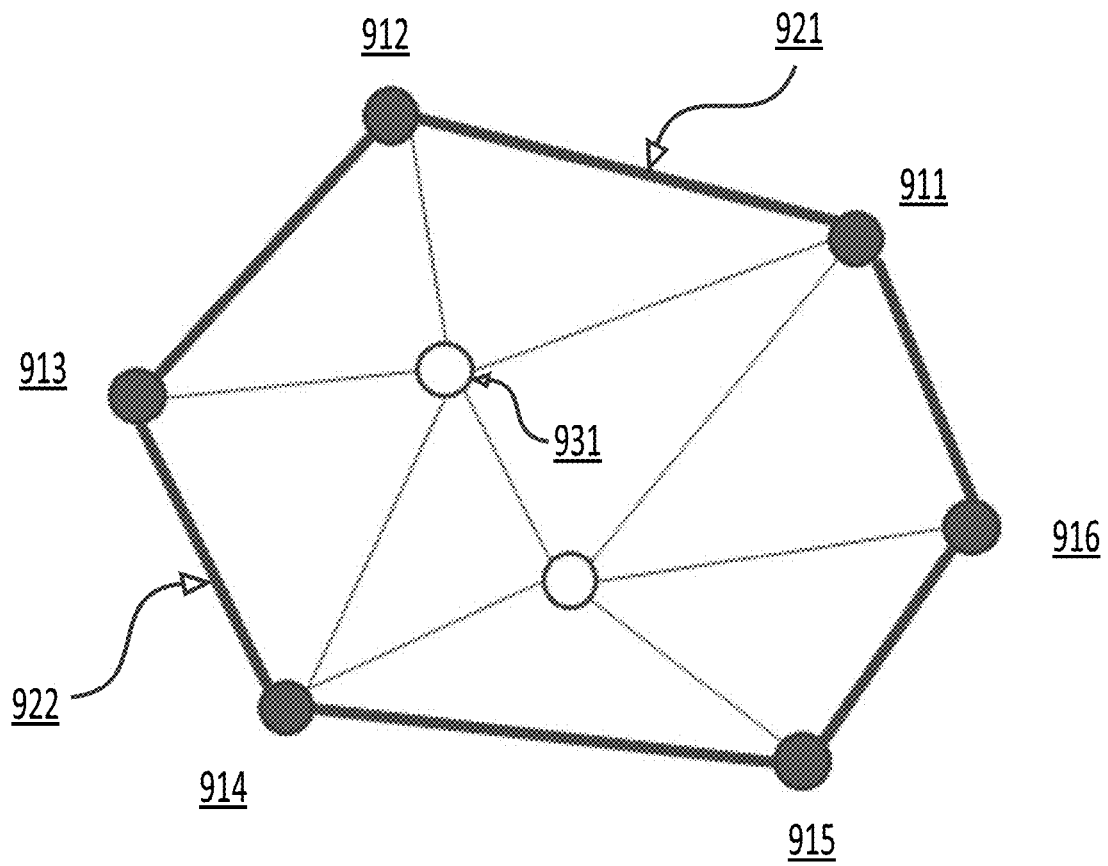
FIG. 9 shows another diagram of a framework for mesh compression according to some embodiments of the disclosure.
Figure 10:
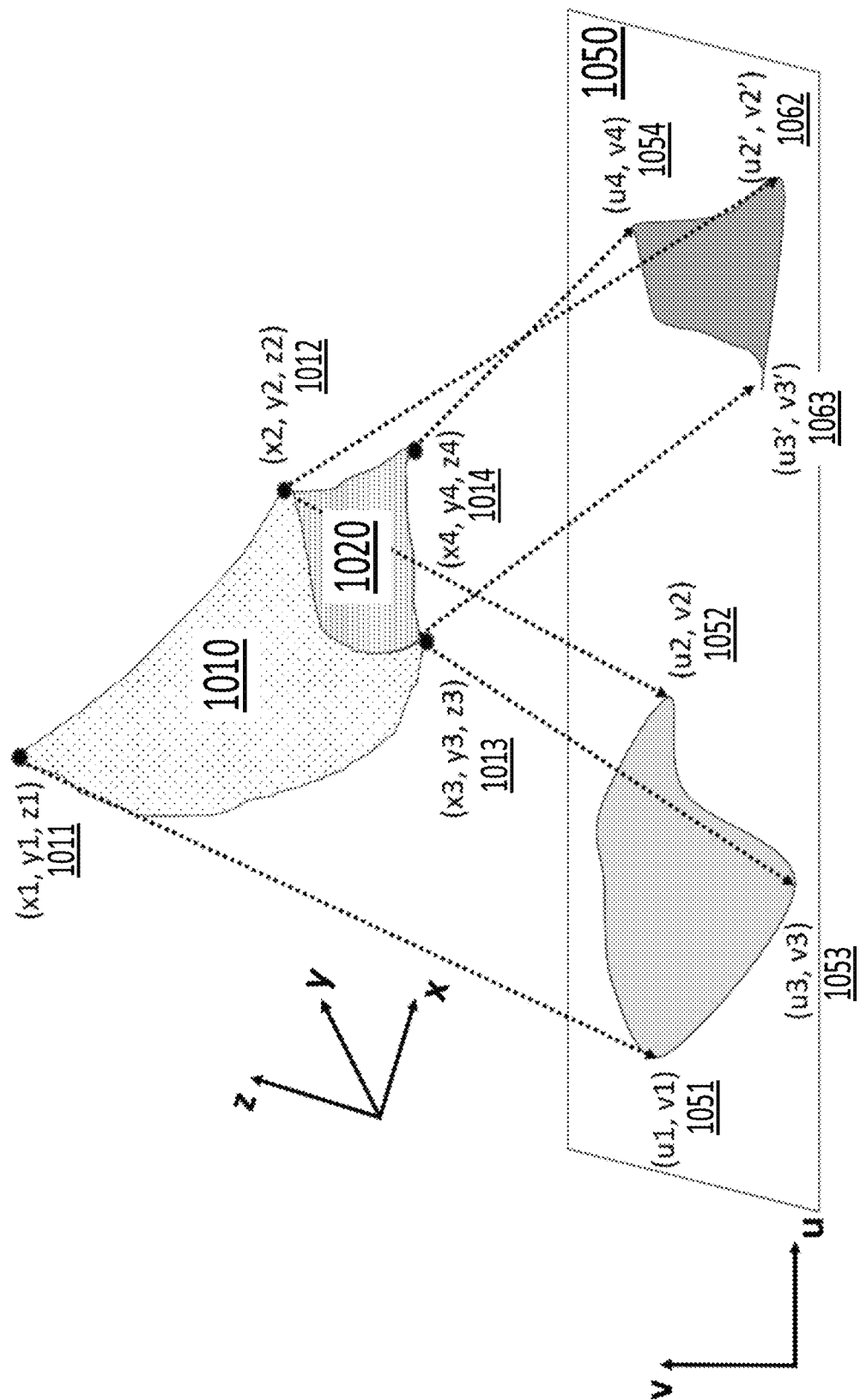
FIG. 10 shows another diagram of a framework for mesh compression according to some embodiments of the disclosure.

FIGS. 9 and 10 illustrate boundary vertices. A boundary vertex may be a single vertex in 3D space, and may be mapped to more than one points in 2D UV space.

Referring to FIG. 9, boundary vertices (911, 912, 913, 914, 915, and 916) may be defined in a 2D UV space. The boundary vertices are located on boundary edges (e.g., 921 and 922) of a connected component (e.g., a patch/chart), and non-boundary vertices (e.g, 931) are located inside the connected component (the patch/chart).

In some implementations, the boundary edge may be determined by checking whether an edge appears only in one triangle: when the edge appears only in one triangle, the edge is a boundary edge; and when the edge appears in more than two triangles, the edge is not a boundary edge.

In some implementations, a portion or all of the following information of boundary vertices is significant and may be coded and signaled in the bitstream: geometry information, i.e., the 3D xyz coordinates; and/or 2D UV coordinates.

In some implementations, a vertex may be shared by more than one mesh surface polygons. When a mesh is split into multiple patches, such vertices may appear on the boundary of multiple patches as the common vertices.

For a non-limiting example, referring to FIG. 10, two adjacent 3D patches (1010 and 1020) may be mapped into a 2D UV plane (1050). In the projected shapes in the UV plane, each point (ui, vi) is corresponding to a 3D vertex with positions in 3D space, represented by 3D coordinates (xi, yi, zi), wherein i is positive integer, such as 1, 2, 3, 4, and etc. Coding of the vertex geometry is then converted into coding the 3-channel values in the 2D plane, where each 3-channel value at a (u, v) position corresponds to the associated 3D position (x, y, z). The projected 2D plane with one or more patches is therefore referred to as geometry image and may therefore be coded using any image or video codec, e.g., a video codec that supports 4:4:4 color formats.

In particular, a vertex on the boundary of two 3D patches becomes a common vertex shared by both patches. When such a vertex is projected onto the 2D plane, it has more than one UV coordinates. For example, a first vertex (1011) in the 3D space may be mapped to a first point (1051) in the 2D UV space, a second vertex (1012) in the 3D space may be mapped to a second point (1052) and a fifth point (1062) in the 2D UV space, a third vertex (1013) in the 3D space may be mapped to a third point (1053) and a sixth point (1063) in the 2D UV space, and a fourth vertex (1014) in the 3D space may be mapped to a fourth point (1054) in the 2D UV space. In other words, multiple points, having their own boundary geometry values, on the UV plane may be corresponding to the same 3D vertex, and thus, their own boundary geometry value should be equal to have the same geometry information. For example, vertices at (1012) (x2, y2, z2) and (1013) (x3, y3, z3) are on the boundary of both patch 1010 and patch 1020. When these two patches are projected to the 2D plane, for patch 1010, the corresponding UV coordinates for these two boundary vertices are (1052) (u2, v2) and (1053) (u3, v3), respectively; for patch 1020, the corresponding UV coordinates for these two boundary vertices are (1062) (u2', v2') and (1063) (u3', v3'), respectively. Note that in this case, the location (1062) (u2', v2') is different form (1052) (u2, v2), and the location (1053) (u3, v3) is different from (1063) (u3', v3').

In some implementations, there are some issues/problems in encoding, signaling, and decoding the geometry information of boundary vertices, considering the geometry information of boundary vertices is of importance for high quality 3D mesh reconstruction during decoding. When one boundary vertex appears in two patches, one boundary vertex corresponds to two points in the 2D UV plane, and the boundary geometry values of the two points should be the same when no compression is applied. However, after compression is applied to different patches, the geometry information of the pair of the same vertex may become different, which may due to the non-lossless nature of some compression method, for example, quantization process. This may affect the mesh reconstruction after decoding. Typically, with distorted geometry for boundary vertices, some cracks may become visible in the reconstructed mesh surface, as the surface becomes no longer smoothly connected from one patch to another.

In some implementations, the boundary geometry information may be coded using lossless or near lossless processes. In some implementations, the boundary geometry information may be coded separately from other vertices inside each patch. Some of the above implementation may affect the encoding/decoding efficiency of 3D mess compression.

The present disclosure describes various embodiments for encoding or decoding 3D mesh with predictive coding of boundary geometry information, addressing at least one issue/problem discussed above, thus, improving efficiency in compressing the geometry information and/or advancing efficient 3D mesh compression technologies.

Figure 11:
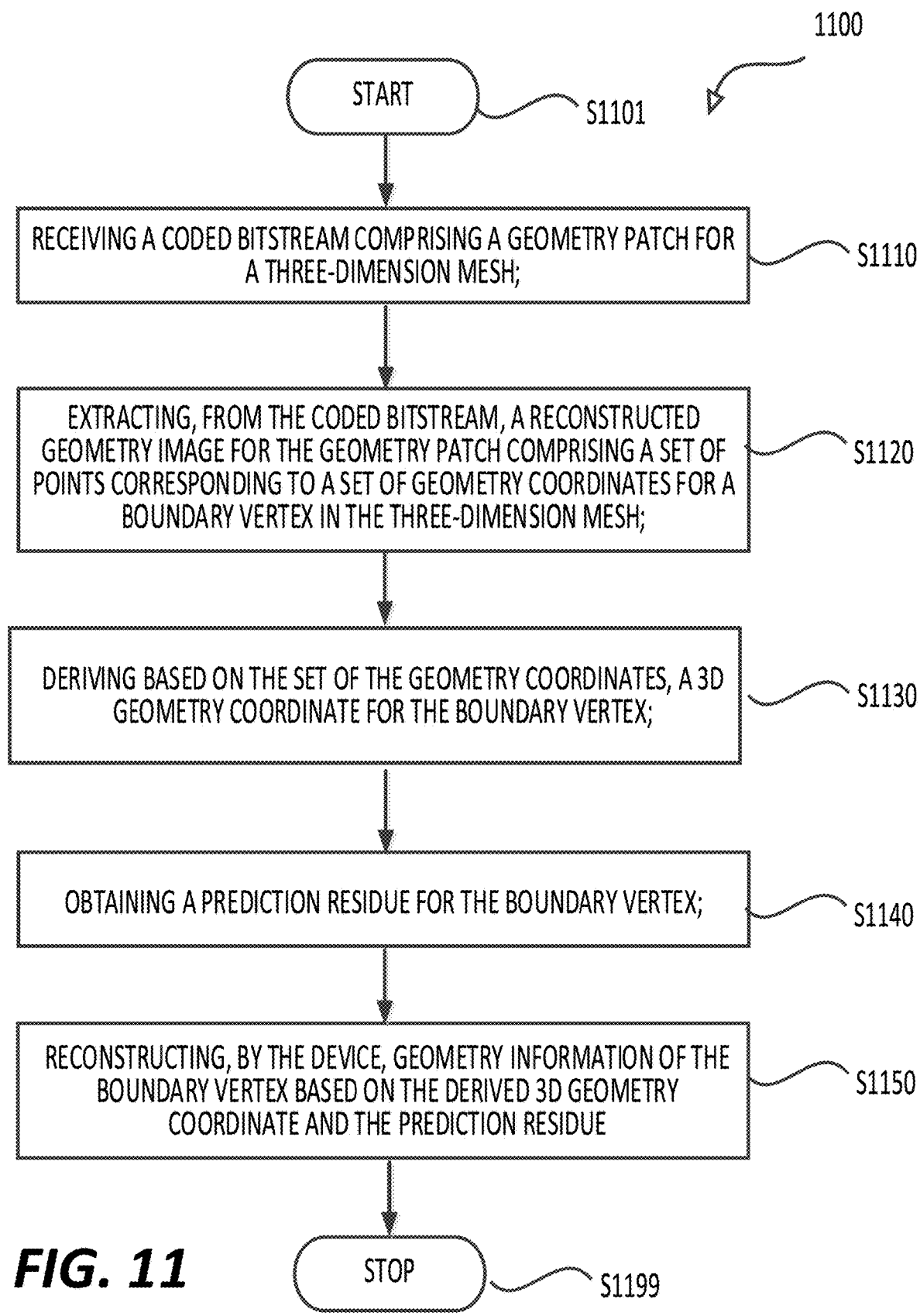
FIG. 11 shows a flow chart outlining a process example in accordance with some embodiments.

FIG. 11 shows a flow chart 1100 of an example method following the principles underlying the implementations above for decoding a 3D mesh with predictive coding of boundary geometry information. The example decoding method flow starts at S1101, and may include a portion or all of the following steps: in S1110, receiving a coded bitstream comprising a geometry patch for a three-dimension mesh; in S1120, extracting, from the coded bitstream, a reconstructed geometry image for the geometry patch comprising a set of points corresponding to a set of geometry coordinates for a boundary vertex in the three-dimension mesh; in S1130, deriving based on the set of the geometry coordinates, a 3D geometry coordinate for the boundary vertex; in S1140, obtaining a prediction residue for the boundary vertex; and in S1150, reconstructing, by the device, geometry information of the boundary vertex based on the derived 3D geometry coordinate and the prediction residue. The example method stops at S1199.

In some implementations, the set of geometry coordinates associated with the set of points may include a plurality of 3D geometry coordinates (x, y, z), and each point in the set of points include a 2D coordinate (u, v) in the UV plane and a pixel value (e.g., RGB channels). The pixel value (e.g., RGB channels) of each point corresponds to each geometry coordinate (x, y, z) in the set of geometry coordinates.

In some implementations, the coded bitstream comprises at least one of the following: a coded geometry map, or a coded metadata. For example, the coded bitstream may be the compressed bitstream in FIG. 4, which may include one or more compressed geometry image/map, one or more compressed texture image/map, one or more compressed occupancy map, and/or compressed auxiliary patch information. Some coded bitstream may not have any occupancy map, as the occupancy map information may be inferred from the decoder side when the boundary vertices of each patch are signaled. In some implementations, the geometry patch is one of the patches corresponding to the coded geometry map.

In some implementations, the reconstructing the geometry information of the boundary vertex based on the derived 3D geometry coordinate and the prediction residue comprises: reconstructing the geometry information of the boundary vertex according to P+Q*QS, wherein P is the derived 3D geometry coordinate, Q is the prediction residue, and QS is a quantization step size.

In some implementations, the quantization step size is signaled in a high-level syntax (HLS) comprising at least one of the following: a sequence header, a frame header, or a slice header.

In some implementations, the extracting, from the coded bitstream, the reconstructed geometry image for the geometry patch comprising the set of points corresponding to the set of geometry coordinates for the boundary vertex in the three-dimension mesh comprises: reconstructing, from the coded bitstream, a geometry image; and obtaining the set of geometry coordinates for the boundary vertex based on pixel values of the set of points in the reconstructed geometry image.

In some implementations, the deriving, based on the set of the geometry coordinates, the 3D geometry coordinate for the boundary vertex comprises: calculating an average of the set of the geometry coordinates to obtain an averaged 3D geometry coordinate; and determining the averaged 3D geometry coordinate as the derived 3D geometry coordinate for the boundary vertex.

In some implementations, the deriving, based on the set of the geometry coordinates, the 3D geometry coordinate for the boundary vertex comprises: calculating a weighted average of the set of the geometry coordinates to obtain a weighted-averaged 3D geometry coordinate; and determining the weighted-averaged 3D geometry coordinate as the derived 3D geometry coordinate for the boundary vertex.

In some implementations, the set of the geometry coordinates comprises a first geometry coordinate for a first patch and a second geometry coordinate corresponding to a second patch; the first patch has a larger sampling rate than the second patch; and a first weight of the first geometry coordinate is larger than a second weight of the second geometry coordinate for the weighted average.

In some implementations, the set of the geometry coordinates comprises a first geometry coordinate for a first patch and a second geometry coordinate corresponding to a second patch; the first patch has a larger patch size than the second patch; and a first weight of the first geometry coordinate is larger than a second weight of the second geometry coordinate for the weighted average.

In some implementations, the set of the geometry coordinates comprises a first geometry coordinate for a first patch and a second geometry coordinate corresponding to a second patch; the first patch has a larger quantization level than the second patch; and a first weight of the first geometry coordinate is smaller than a second weight of the second geometry coordinate for the weighted average.

In some implementations, the deriving, based on the set of the geometry coordinates, the 3D geometry coordinate for the boundary vertex comprises: establishing a candidate list based on the set of the geometry coordinates; obtaining, from the coded bitstream, an index corresponding to the candidate list; and determining the derived 3D geometry coordinate for the boundary vertex based on the index and the candidate list.

In some implementations, an order of geometry coordinates in the candidate list is determined according to their decoding order.

In some implementations, the extracting, from the coded bitstream, the reconstructed geometry image for the geometry patch comprising the set of points corresponding to the set of geometry coordinates for the boundary vertex in the three-dimension mesh comprises: reconstructing geometry information of a second boundary vertex, wherein the second boundary vertex is reconstructed before the boundary vertex is reconstructed; and determining the geometry information of the second boundary vertex as a geometry coordinate in the set of geometry coordinates.

In some implementations, the second boundary vertex is a neighboring vertex of the boundary vertex.

In some implementations, another example method for decoding a 3D mesh with predictive coding of boundary geometry information may include a portion or all of the following steps: receiving a coded bitstream; extracting, from the coded bitstream, a plurality of geometry predictions for a boundary vertex, wherein each geometry prediction comprises a set of predicted geometry coordinates; determining, based on the plurality of the geometry predictions, a predicted geometry value for the boundary vertex; obtaining a prediction residue for the boundary vertex; and reconstructing geometry information of the boundary vertex based on the predicted geometry value and the prediction residue.

In some implementations, the coded bitstream comprises at least one of the following: a coded geometry map, or a coded metadata. For example, the coded bitstream may be the compressed bitstream in FIG. 4, which may include one or more compressed geometry image/map, one or more compressed texture image/map, one or more compressed occupancy map, and/or compressed auxiliary patch information. Some coded bitstream may not have any occupancy map, as the occupancy map information may be inferred from the decoder side when the boundary vertices of each patch are signaled. In some implementations, the geometry patch is one of the patches corresponding to the coded geometry map.

In some implementations, the reconstructing the geometry information of the boundary vertex based on the predicted geometry value and the prediction residue comprises:

reconstructing the geometry information of the boundary vertex according to P+Q*QS, wherein P is the predicted geometry value, Q is the prediction residue, and QS is a quantization step size. In some implementation, the predicted geometry value (P) includes a set of 3D coordinates (x_P, y_P, z_P), and/or the prediction residue (Q) includes a set of 3D coordinates (x_Q, y_Q, z_Q). The quantization step size (QS) may be a single value (QS_common) being same for all three 3D coordinates, or may be a set of three values (QS_x, QS_y, QS_z), each of which corresponds to one coordinate in the 3D coordinates. The reconstructed geometry information may be (x_P+x_Q*QS_common, y_P+y_Q*QS_common, z_P+z_Q*QS_common) or (x_P+x_Q*QS_x, y_P+y_Q*QSy, z_P+z_Q*QS_z).

In some implementations, the quantization step size is signaled in a high-level syntax (HLS) comprising at least one of the following: a sequence header, a frame header, or a slice header.

In some implementations, the extracting, from the coded bitstream, the plurality of geometry predictions for the boundary vertex comprises: reconstructing, from the coded bitstream, a geometry image; and obtaining the plurality of the geometry predictions for the boundary vertex based on a plurality of pixels in the geometry image corresponding to the boundary vertex, respectively.

In some implementations, the determining, based on the plurality of the geometry predictions, the predicted geometry value for the boundary vertex comprises: calculating an average of the plurality of the geometry predictions to obtain an averaged geometry prediction; and determining the averaged geometry prediction as the predicted geometry value for the boundary vertex.

In some implementations, the determining, based on the plurality of the geometry predictions, the predicted geometry value for the boundary vertex comprises: calculating a weighted average of the plurality of the geometry predictions to obtain a weight-averaged geometry prediction; and determining the weight-averaged geometry prediction as the predicted geometry value for the boundary vertex.

In some implementations, the plurality of the geometry predictions comprises a first geometry prediction for a first patch and a second geometry prediction corresponding to a second patch; the first patch has a larger sampling rate than the second patch; and a first weight of the first geometry prediction is larger than a second weight of the second geometry prediction for the weighted average.

In some implementations, the plurality of the geometry predictions comprises a first geometry prediction for a first patch and a second geometry prediction corresponding to a second patch; the first patch has a larger patch size than the second patch; and a first weight of the first geometry prediction is larger than a second weight of the second geometry prediction for the weighted average.

In some implementations, the plurality of the geometry predictions comprises a first geometry prediction for a first patch and a second geometry prediction corresponding to a second patch; the first patch has a larger quantization level than the second patch; and a first weight of the first geometry prediction is smaller than a second weight of the second geometry prediction for the weighted average.

In some implementations, the determining, based on the plurality of the geometry predictions, the predicted geometry value for the boundary vertex comprises: establishing a prediction candidate list based on the plurality of the geometry predictions; obtaining, from the coded bitstream, an index corresponding to the prediction candidate list; and determining the predicted geometry value based on the index and the prediction candidate list.

In some implementations, an order of geometry predictions in the prediction candidate list is determined according to an decoding order of the geometry predictions.

In some implementations, the extracting, from the coded bitstream, the plurality of geometry predictions for the boundary vertex comprises: reconstructing geometry information of a second boundary vertex, wherein the second boundary vertex is reconstructed before the boundary vertex is reconstructed; and/or determining the geometry information of the second boundary vertex as a geometry prediction in the plurality of the geometry predictions.

In some implementations, the second boundary vertex is a neighboring vertex of the boundary vertex.

The various steps in one or more embodiments or implementations may be applied individually or by any form of combinations. The various embodiments in the present disclosure may be applied to dynamic meshes or static meshes.

In static meshes, there may be only one frame of the mesh or the mesh content does not change over time. The various embodiments in the present disclosure may be extended to coding of depth images/attribute images/texture images/etc.

In some implementations, geometry information of a boundary vertex (or referred as boundary geometry information), which includes the xyz coordinates, may be predicted either from the reconstructed geometry image (given the corresponding uv coordinates), or from the previous reconstructed boundary information for another boundary vertex.

In some implementations, on the encoder side, the prediction residual of boundary geometry may be derived by subtracting the original geometry from the prediction value, i.e., $R_i = O_i - P_i$, where $O_i$ is the original xyz coordinates of the $i^{th}$ boundary vertex, $P_i$ is the predicted xyz coordinates of the $i^{th}$ boundary vertex, and $R_i$ is the prediction residual of xyz coordinates of the $i^{th}$ boundary vertex. The prediction residual may then be quantized and entropy coded.

In some implementations, the prediction residual may be quantized by a scalar value, i.e., $$Q_i = \text{round}\left(\frac{R_i}{QS}\right),$$

where QS stands for the quantization step size. The QS may be signaled in a high-level syntax (HLS), e.g., a sequence header, a frame header, a slice header, etc.

In some implementations, on the decoder side, the reconstructed geometry information may be derived by $\text{Rec}_i = P_i + Q_i * QS$.

In some implementations, the prediction of the boundary geometry information may be performed according to at least one of the following exemplary methods.

For one exemplary method, the prediction of the boundary geometry information may be derived from the reconstructed geometry image, i.e., $P_i = \text{GIM\_REC}(u_i, v_i)$. GIM_REC denotes the reconstructed geometry image, $P_i$ is the predicted geometry xyz coordinates of the $i^{th}$ boundary vertex, and $(u_i, v_i)$ are the UV coordinates in the geometry image of the $i^{th}$ boundary vertex.

Considering one boundary vertex (xyz) may correspond to multiple uv coordinates, one or more of multiple-hypothesis predictions may be used to obtain a prediction based on multiple $P_i = \text{GIM\_REC}(u_i, v_i)$ due to multiple uv coordinates.

In some implementations, an averaged value of multiple predictions may be used as the prediction of the $i^{th}$ boundary vertex, i.e., $$P_i = \frac{\sum_{j=1}^{N} \text{GIM\_REC}(u_j, v_j)}{N},$$

where N is the total number of the uv coordinates that correspond to the same xyz geometry position, and $(u_j, v_j)$ is the $j^{th}$ correspondence.

In some implementations, a prediction candidate list may be established, and one item may be selected from the prediction candidate list as the prediction of the boundary vertex. One such predictor vertex may come from one of multiple predictions. For a non-limiting example, the encoder/decoding order of the multiple predictions may be used to establish the order of multiple candidates in the list.

When more than one predictor is allowed to predict the current vertex's geometry information, an index is signaled in the bitstream to indicate which one in the list is chosen.

In some implementations, a weighted average of multiple predictions may be used as the prediction of the $i^{th}$ boundary vertex, i.e., $$P_i = \frac{\sum_{j=1}^{N} w_j \cdot \text{GIM\_REC}(u_j, v_j)}{\sum_{j=1}^{N} w_j},$$

wherein $w_j$ is the weighting factor of the $j^{th}$ correspondence, which may be determined based on at least one of many other factors, such as a sampling rate of the corresponding patch, a corresponding patch size, etc. For a non-limiting example, the larger a sampling rate of a patch is, the higher the corresponding weighting factor is; and/or the larger a patch size of a patch is, the higher the corresponding weighting factor is.

In some implementations, the prediction of the boundary geometry information may be derived from the previous reconstructed boundary vertices.

For a non-limiting example, on the encoder side, a boundary vertex's geometry information may be encoded as being predicted by another boundary vertex's geometry information that has been coded and becomes available when coding the current boundary vertex, i.e., $P_i = \text{Rec}_j$, where $j \leq i$, i corresponds to the current boundary vertex, and j corresponds to the boundary vertex that has been coded and becomes available when coding the current boundary vertex. On the decoder side, a boundary vertex's geometry information may be decoded as being predicted by another boundary vertex's geometry information that has been decoded (or reconstructed) and becomes available when decoding the current boundary vertex, i.e., $P_i = \text{Rec}_j$, where $j < i$, i corresponds to the current boundary vertex, and j corresponds to the boundary vertex that has been reconstructed.

For another non-limiting example, a boundary vertex's geometry information may be predicted based on its neighboring boundary vertex of the same patch. In the 3D space, a set of boundary vertices form the boundary of a patch. Among these vertices, two neighboring vertices are close to each other in position, so that their geometry information are also close to each other, leading to high efficiency of prediction.

For another non-limiting example, a boundary vertex's geometry information may be predicted by multiple boundary vertices' geometry information that have been coded and become available when coding the current boundary vertex's geometry information. When multiple corresponding boundary vertices (through multiple UV coordinates) are available to predict the current boundary vertex, the following prediction mechanism may be applied.

In one prediction mechanism, a prediction candidate list may be established. One such predictor vertex may come from one previously coded patch. For a non-limiting example, the encoder/decoding order of the patches may be used to establish the order of multiple candidates in the list. When more than one predictor is allowed to predict the current vertex's geometry information, an index is signaled in the bitstream to indicate which one in the list is chosen.

In another prediction mechanism, an average or weighted average of the multiple candidates (when applicable) may be generated to predict the current boundary vertex. The weighting parameter for each candidate may be determined according to one or more factors. For a non-limiting example, the weighting factor may be determined based on the quantization level (such as QS) when the candidate predictor is coded. For example, heavily quantized candidate, which corresponds to larger quantization step size (QS), may corresponds to smaller weight.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits). In some examples, the one or more processors execute a program that is stored in a non-transitory computer-readable medium.

The techniques described above, can be implemented as computer software using computer-readable instructions and physically stored in one or more computer-readable media. For example, FIG. 12 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
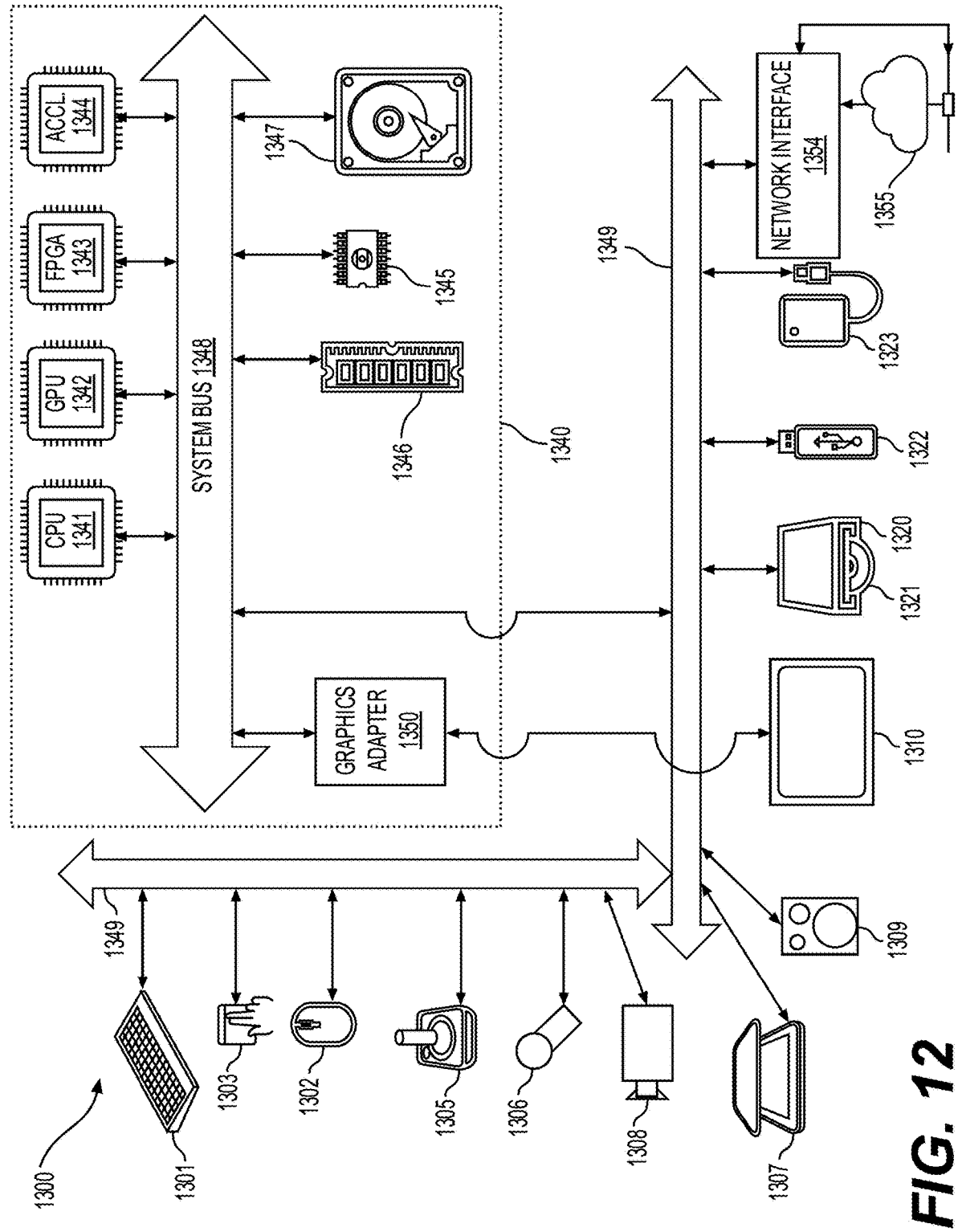
FIG. 12 is a schematic illustration of a computer system in accordance with an embodiment.

The components shown in FIG. 12 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding a geometry patch for a three-dimension mesh, comprising;

receiving, by a device comprising a memory storing instructions and a processor in communication with the memory, a coded bitstream comprising a geometry patch for a three-dimension mesh;

extracting, by the device from the coded bitstream, a reconstructed geometry image for the geometry patch comprising a set of points corresponding to a set of geometry coordinates for a boundary vertex in the three-dimension mesh;

deriving, by the device, based on the set of the geometry coordinates, a 3D geometry coordinate for the boundary vertex;

obtaining, by the device, a prediction residue for the boundary vertex; and reconstructing, by the device, geometry information of the boundary vertex based on the derived 3D geometry coordinate and the prediction residue, by:

reconstructing the geometry information of the boundary vertex according to P+Q*QS, wherein P is the derived 3D geometry coordinate, Q is the prediction residue, and QS is a quantization step size.

2. The method of claim 1, wherein:
the coded bitstream comprises at least one of the following:
a coded geometry map, or
a coded metadata.

3. The method of claim 1, wherein
the quantization step size is signaled in a high-level syntax (HLS) comprising at least one of the following: a sequence header, a frame header, or a slice header.

4. The method of claim 1, wherein the extracting, from the coded bitstream, the reconstructed geometry image for the geometry patch comprising the set of points corresponding to the set of geometry coordinates for the boundary vertex in the three-dimension mesh comprises:
reconstructing, from the coded bitstream, a geometry image; and
obtaining the set of geometry coordinates for the boundary vertex based on pixel values of the set of points in the reconstructed geometry image.

5. The method of claim 1, wherein the deriving, based on the set of the geometry coordinates, the 3D geometry coordinate for the boundary vertex comprises:
calculating an average of the set of the geometry coordinates to obtain an averaged 3D geometry coordinate; and
determining the averaged 3D geometry coordinate as the derived 3D geometry coordinate for the boundary vertex.

6. The method of claim 1, wherein the deriving, based on the set of the geometry coordinates, the 3D geometry coordinate for the boundary vertex comprises:
calculating a weighted average of the set of the geometry coordinates to obtain a weighted-averaged 3D geometry coordinate; and
determining the weighted-averaged 3D geometry coordinate as the derived 3D geometry coordinate for the boundary vertex.

7. The method of claim 6, wherein:
the set of the geometry coordinates comprises a first geometry coordinate for a first patch and a second geometry coordinate corresponding to a second patch;
the first patch has a larger sampling rate than the second patch; and
a first weight of the first geometry coordinate is larger than a second weight of the second geometry coordinate for the weighted average.

8. The method of claim 6, wherein:
the set of the geometry coordinates comprises a first geometry coordinate for a first patch and a second geometry coordinate corresponding to a second patch;
the first patch has a larger patch size than the second patch; and
a first weight of the first geometry coordinate is larger than a second weight of the second geometry coordinate for the weighted average.

9. The method of claim 6, wherein:
the set of the geometry coordinates comprises a first geometry coordinate for a first patch and a second geometry coordinate corresponding to a second patch;
the first patch has a larger quantization level than the second patch; and
a first weight of the first geometry coordinate is smaller than a second weight of the second geometry coordinate for the weighted average.

10. The method of claim 1, wherein the deriving, based on the set of the geometry coordinates, the 3D geometry coordinate for the boundary vertex comprises:
establishing a candidate list based on the set of the geometry coordinates;
obtaining, from the coded bitstream, an index corresponding to the candidate list; and
determining the derived 3D geometry coordinate for the boundary vertex based on the index and the candidate list.

11. The method of claim 10, wherein:
an order of geometry coordinates in the candidate list is determined according to their decoding order.

12. The method of claim 1, wherein the extracting, from the coded bitstream, the reconstructed geometry image for the geometry patch comprising the set of points corresponding to the set of geometry coordinates for the boundary vertex in the three-dimension mesh comprises:
reconstructing geometry information of a second boundary vertex, wherein the second boundary vertex is reconstructed before the boundary vertex is reconstructed; and
determining the geometry information of the second boundary vertex as a geometry coordinate in the set of geometry coordinates.

13. The method of claim 12, wherein:
the second boundary vertex is a neighboring vertex of the boundary vertex.

14. An apparatus for encoding a geometry patch for a three-dimension mesh into a coded bitstream, the apparatus comprising:
a memory storing instructions; and
a processor in communication with the memory, wherein, when the processor executes the instructions, the processor is configured to cause the apparatus to:
receive a bitstream comprising a geometry patch for a three-dimension mesh;
determine, based on the bitstream, a reconstructed geometry image for the geometry patch comprising a set of points corresponding to a set of geometry coordinates for a boundary vertex in the three-dimension mesh;
encode the reconstructed geometry image into a coded bitstream;
derive, based on the set of the geometry coordinates, a 3D geometry coordinate for the boundary vertex;
obtain a prediction residue for the boundary vertex; and reconstruct geometry information of the boundary vertex based on the derived 3D geometry coordinate and the prediction residue, by:
    reconstructing the geometry information of the boundary vertex according to P+Q*QS, wherein P is the derived 3D geometry coordinate, Q is the prediction residue, and QS is a quantization step size.

15. The apparatus according to claim 14, wherein, when the processor is configured to cause the apparatus to extract, from the coded bitstream, the reconstructed geometry image for the geometry patch comprising the set of points corresponding to the set of geometry coordinates for the boundary vertex in the three-dimension mesh, the processor is configured to cause the apparatus to:
    reconstruct, from the coded bitstream, a geometry image; and
    obtain the set of geometry coordinates for the boundary vertex based on pixel values of the set of points in the reconstructed geometry image.

16. The apparatus according to claim 14, wherein, when the processor is configured to cause the apparatus to derive, based on the set of the geometry coordinates, the 3D geometry coordinate for the boundary vertex, the processor is configured to cause the apparatus to:
    calculate an average of the set of the geometry coordinates to obtain an averaged 3D geometry coordinate; and
    determine the averaged 3D geometry coordinate as the derived 3D geometry coordinate for the boundary vertex.

17. The apparatus according to claim 14, wherein, when the processor is configured to cause the apparatus to derive, based on the set of the geometry coordinates, the 3D geometry coordinate for the boundary vertex, the processor is configured to cause the apparatus to:
    establish a candidate list based on the set of the geometry coordinates;
    obtain, from the coded bitstream, an index corresponding to the candidate list; and
    determine the derived 3D geometry coordinate for the boundary vertex based on the index and the candidate list.

18. A method of processing video data, the method comprising:
    performing, by a device comprising a memory storing instructions and a processor in communication with the memory, a conversion between video data and a bitstream by:
        receiving the video data comprising a geometry patch for a three-dimension mesh;
        determining, based on the video data, a reconstructed geometry image for the geometry patch comprising a set of points corresponding to a set of geometry coordinates for a boundary vertex in the three-dimension mesh;
        encoding the reconstructed geometry image into the bitstream;
        deriving , based on the set of the geometry coordinates, a 3D geometry coordinate for the boundary vertex;
        obtaining a prediction residue for the boundary vertex; and
        reconstructing geometry information of the boundary vertex based on the derived 3D geometry coordinate and the prediction residue, by:
            reconstructing the geometry information of the boundary vertex according to P+Q*QS, wherein P is the derived 3D geometry coordinate, Q is the prediction residue, and QS is a quantization step size.

* * * * *